US010243229B2

(12) United States Patent
Kunita et al.

(10) Patent No.: US 10,243,229 B2
(45) Date of Patent: Mar. 26, 2019

(54) POLYMER ELECTROLYTE MEMBRANE, CATALYST COATED MEMBRANE, MEMBRANE ELECTRODE ASSEMBLY, AND POLYMER ELECTROLYTE FUEL CELL

(71) Applicant: Toray Industries, Inc., Tokyo (JP)

(72) Inventors: Tomoyuki Kunita, Otsu (JP); Daisuke Izuhara, Otsu (JP); Hiroaki Umeda, Otsu (JP)

(73) Assignee: Toray Industries, Inc. (JP)

( * ) Notice: Subject to any disclaimer, the term of this patent is extended or adjusted under 35 U.S.C. 154(b) by 58 days.

(21) Appl. No.: 15/124,044

(22) PCT Filed: Mar. 6, 2015

(86) PCT No.: PCT/JP2015/056586
§ 371 (c)(1),
(2) Date: Sep. 7, 2016

(87) PCT Pub. No.: WO2015/133594
PCT Pub. Date: Sep. 11, 2015

(65) Prior Publication Data
US 2017/0018793 A1 Jan. 19, 2017

(30) Foreign Application Priority Data
Mar. 7, 2014 (JP) ................. 2014-044749

(51) Int. Cl.
C08J 5/22 (2006.01)
H01B 1/12 (2006.01)
C08G 65/40 (2006.01)
C08G 73/18 (2006.01)
C08G 75/23 (2006.01)
C08L 71/00 (2006.01)
C08L 71/08 (2006.01)
C08L 79/04 (2006.01)
H01M 8/103 (2016.01)
H01M 8/1018 (2016.01)
H01M 8/1025 (2016.01)
H01M 8/1027 (2016.01)
H01M 8/1032 (2016.01)
H01M 8/1044 (2016.01)

(52) U.S. Cl.
CPC .......... H01M 8/103 (2013.01); C08G 65/405 (2013.01); C08G 65/4012 (2013.01); C08G 65/4056 (2013.01); C08G 73/18 (2013.01); C08G 75/23 (2013.01); C08J 5/2256 (2013.01); C08J 5/2268 (2013.01); C08L 71/00 (2013.01); C08L 71/08 (2013.01); C08L 79/04 (2013.01); H01B 1/122 (2013.01); H01M 8/1027 (2013.01); H01M 8/1044 (2013.01); C08G 2650/40 (2013.01); C08J 2379/04 (2013.01); C08J 2381/06 (2013.01); C08J 2479/04 (2013.01); H01M 8/1025 (2013.01); H01M 8/1032 (2013.01); H01M 2008/1095 (2013.01); H01M 2300/0082 (2013.01)

(58) Field of Classification Search
CPC .. H01M 8/103; H01M 8/1027; H01M 8/1044; H01M 8/1025; H01M 8/1032; H01M 2008/1095; H01M 2300/0082; C08G 65/4012; C08G 65/405; C08G 65/4056; C08G 73/18; C08G 75/23; C08G 2650/40; C08J 5/2256; C08J 5/2268; C08J 2379/04; C08J 2381/06; C08J 2479/04; C08L 71/00; C08L 71/08; C08L 79/04
See application file for complete search history.

(56) References Cited

U.S. PATENT DOCUMENTS

2006/0199062 A1* 9/2006 Yanagita .................. C08F 6/02
429/483
2012/0219879 A1* 8/2012 Hu ...................... H01M 8/1027
429/494

FOREIGN PATENT DOCUMENTS

| CA | 2350205 A1 * | 5/2000 | .......... H01M 8/1025 |
|---|---|---|---|
| JP | 02-016126 A | 1/1990 | |
| JP | 02-208322 A | 8/1990 | |
| JP | 2002-512291 A | 4/2002 | |
| JP | 2004-055257 A | 2/2004 | |
| JP | 2005-350658 A | 12/2005 | |
| JP | 2013-067686 A | 4/2013 | |
| JP | 2013-080701 A | 5/2013 | |

(Continued)

OTHER PUBLICATIONS

JPlat Pat Machine Translation of the detailed description of JP 2013-080701A. (Year: 2013).*

(Continued)

Primary Examiner — Gregg Cantelmo
(74) Attorney, Agent, or Firm — DLA Piper LLP (US)

(57) ABSTRACT

A polymer electrolyte composition is excellent in practicality which has such an excellent chemical stability as to be able to withstand a strong oxidizing atmosphere during operation of a fuel cell and is capable of achieving excellent proton conductivity under a low-humidified condition and excellent mechanical strength and physical durability as well as a polymer electrolyte membrane, a membrane electrode assembly, and a polymer electrolyte fuel cell which use the polymer electrolyte composition. The polymer electrolyte membrane is a polymer electrolyte membrane that contains at least an ionic group-containing polymer electrolyte and a polyazole, which is a polymer electrolyte membrane in which a phase separation of 2 nm or larger in which the polyazole is a main component is not observed in transmission type electron microscopic observation.

14 Claims, 1 Drawing Sheet

(56) References Cited

FOREIGN PATENT DOCUMENTS

| WO | 2006/067872 A1 | 6/2006 |
| WO | 2008/102851 A1 | 8/2008 |

OTHER PUBLICATIONS

Hiroyasu Takenaka et al., "Studies on Solid Polymer Electrolyte Water Electrolysis II. Preparation Methods for Membrane-Electrocatalyst Composite" *Denki Kagaku*, 1985, 53, p. 261 with English Abstract.

Sophia Yanagimachi et al., "Investigation of Introducing a Phosphoric Acid Group Into Poly(4-phenoxybenzoyle - 1, 4- phenylene) (I)", *Polymer Preprints*, Japan 51, 2002, p. 750, with English Abstract.

E.A. Ticianelli et al., "Methods to Advance Technology of Proton Exchange Membrane Fuel Cells," Journal of the Electrochemical Society, vol. 135, Issue 9, 1988, pp. 2209-2214 (Abstract).

Frank S. Bates et al., "Block Copolymer Thermodynamics: Theory and Experiment," Physical Chemistry, vol. 41, 1990, pp. 525-557 (Abstract).

Feng Wang et al., "Direct polymerization of sulfonated poly(arylene ether sulfone) random (statistical) copolymers: candidates for new proton exchange membranes," Journal of Membrane Science, vol. 197, Issues 1-2, Mar. 15, 2002, pp. 231-242 (Abstract).

\* cited by examiner

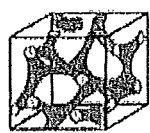 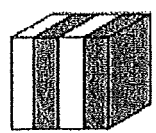 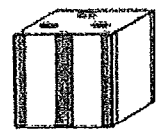 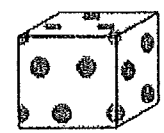
(M1)　　　(M2)　　　(M3)　　　(M4)

POLYMER ELECTROLYTE MEMBRANE, CATALYST COATED MEMBRANE, MEMBRANE ELECTRODE ASSEMBLY, AND POLYMER ELECTROLYTE FUEL CELL

TECHNICAL FIELD

This disclosure relates to a polymer electrolyte membrane and, in particular, relates to a polymer electrolyte membrane excellent in practicality having such an excellent chemical stability as to be able to withstand a strong oxidizing atmosphere during operation of a fuel cell and is capable of achieving excellent proton conductivity under a low-humidified condition and excellent mechanical strength and physical durability and to a catalyst coated membrane, a membrane electrode assembly, and a polymer electrolyte fuel cell which use the polymer electrolyte membrane.

BACKGROUND

A fuel cell is a kind of electricity generating apparatus that extracts electric energy by electrochemically oxidizing a fuel such as hydrogen or methanol and, in recent years, is drawing attention as a clean energy supply source. In particular, a polymer electrolyte fuel cell, because of its standard operating temperature being as low as about 100° C. and its energy density being high, is expected to be widely applied as distributed electricity generating facilities on relatively small scales or electricity generating apparatuses for mobile units such as motor vehicles or ships and boats. Furthermore, the polymer electrolyte fuel cell is also drawing attention as electricity sources for small-size mobile appliances and portable appliances and is expected to be mounted in cellular phones, personal computers and the like, replacing the secondary batteries such as nickel hydride batteries and lithium-ion batteries.

A fuel cell is usually constituted of a cell provided as a unit in which electrodes, an anode and a cathode, on which reactions responsible for electricity generation and a polymer electrolyte membrane that becomes a proton conductor between the anode and the cathode constitute a membrane electrode assembly (hereinafter, sometimes referred to simply as MEA) and the MEA is sandwiched between separators. A main component of the polymer electrolyte membrane is an ionic group-containing polymer (polymer electrolyte material). To increase durability, a polymer electrolyte composition compounded with an additive and the like may also be used as the main component. The polymer electrolyte composition is also suitable as a binder or the like in an electrode catalyst layer for use in a particularly severely oxidizing atmosphere. As for required characteristics of the polymer electrolyte membrane and the polymer electrolyte composition, high proton conductivity is first cited. Particularly, having a high proton conductivity even in a high-temperature low-humidified condition is needed. Furthermore, the polymer electrolyte membrane and the polymer electrolyte composition are responsible for a function as a barrier that prevents a direct reaction between fuel and oxygen and therefore are required to have low permeability to the fuel. Furthermore, the polymer electrolyte membrane and the polymer electrolyte composition also need to have a chemical stability to withstand a strong oxidizing atmosphere during operation of the fuel cell and a mechanical strength and a physical durability that enable the withstanding of thin membrane formation and repetitions of swelling and dryness and the like.

So far, as the polymer electrolyte membrane, Nafion (registered trademark) (made by DuPont company), which is a perfluorosulfonic acid based polymer, has been widely used. Nafion (registered trademark), which is manufactured through a multistep synthesis, is very expensive and has an issue that fuel crossover is great. Furthermore, a problem of being low in softening point and unable to be used at high temperature, a problem of after-use disposal process, a problem of materials thereof being difficult to recycle and so on have been pointed out. Furthermore, as a polymer electrolyte membrane low in cost and excellent in membrane characteristics which can replace Nafion (registered trademark), hydrocarbon based electrolyte membranes have in recent years been being developed more and more actively.

However, those polymer electrolyte membranes all have a problem of the chemical stability falling short when used in a polymer electrolyte fuel cell. The mechanism of the chemical degradation has not been sufficiently elucidated. However, it is conceivable that hydrogen peroxide generated mainly at the electrode during electricity generation or hydroxy radicals generated by the aforementioned hydrogen peroxide reacting with iron ions or copper ions present in the membrane cuts polymer chains or side chains so that the polymer electrolyte membrane has a reduced membrane thickness or becomes weak. Moreover, there is a problem that, as swell and shrinkage occur repeatedly with changes in humidity, the weakened polymer electrolyte membrane breaks resulting in failure of electricity generation.

Under such circumstances, compounding a perfluoro based electrolyte membrane or a hydrocarbon based electrolyte membrane with an antioxidant to improve the mechanical strength and the chemistry stability and better the durability is being considered.

For example, International Publication WO 2008/102851 proposes a polymer electrolyte membrane in which a perfluorosulfonic acid based polymer has been compounded with a polyphenylene sulfide (hereinafter, sometimes referred to simply as PPS), which is a sulfur-containing polymer, and a polybenzimidazole (hereinafter, sometimes referred to simply as PBI), which is a nitrogen-containing polymer.

Japanese Unexamined Patent Publication (Kokai) No. 2005-350658 proposes a polymer electrolyte membrane in which a perfluorosulfonic acid based polymer or a sulfonic acid group-containing polyether ketone based polymer (hereinafter, sometimes referred to simply as sPEK) is compounded with polyamic acid or polyimide.

Japanese Unexamined Patent Publication (Kokai) No. 203-80701 proposes a polymer electrolyte membrane in which a perfluorosulfonic acid based polymer or sPEK is compounded with insoluble PBI particles.

Japanese Unexamined Patent Publication (Kokai) No. 2004-55257 proposes a polymer electrolyte produced by molding, through heated pressing, a mixed particle obtained by precipitation after synthesis of insoluble PBI in the presence of sulfonated PPS.

International Publication WO 2006/67872 proposes a polymer electrolyte membrane in which a polymer electrolyte and PBI have been mixed and therefore an insoluble PBI particle is contained.

However, as for WO '851, the durability is not sufficient.

As for JP '658, although improvement of durability is intended but not sufficient and the electricity generation performance is also insufficient.

As for JP 701, although durability of the polymer electrolyte membrane is able to be improved to a certain extent, further improvement in the long-term durability is desired.

As for JP '257 and WO '872, durability is not sufficient.

Thus, the conventional polymer electrolyte membranes are insufficient as a means of improving economy, workability, proton conductivity, mechanical strength, chemical stability, and physical durability, and have not been able to be industrially useful polymer electrolyte membranes.

In view of the foregoing background, it could be helpful to provide a polymer electrolyte membrane, a catalyst coated membrane, a membrane electrode assembly, and a polymer electrolyte fuel cell which are excellent in practicality and which have such excellent chemical stability as to be able to withstand a strong oxidizing atmosphere during operation of the fuel cell and are able to achieve excellent proton conductivity under a low-humidified condition and excellent mechanical strength and physical durability.

SUMMARY

In conjunction with a polymer electrolyte membrane for fuel batteries or the like, we found that compounding an ionic group-containing polymer electrolyte with polyazole to make a uniform polymer electrolyte membrane develops excellent performance in proton conductivity and electricity generation characteristics in low-humidified conditions as well, workability such as membrane formability, chemical stability such as oxidation resistance, resistance to radicals, hydrolysis resistance, physical durability such as the mechanical strength of the membrane and hot water resistance, particularly in the use in fuel batteries.

That is, the polymer electrolyte membrane contains at least an ionic group-containing polymer electrolyte and a polyazole, characterized by being a polymer electrolyte membrane in which a phase separation of 2 nm or larger in which the polyazole is a main component is not observed in transmission type electron microscopic observation.

A polymer electrolyte membrane, a catalyst coated membrane, a membrane electrode assembly, and a polymer electrolyte fuel cell excellent in practicality and having such excellent chemical stability as to be able to withstand a strong oxidizing atmosphere during operation of the fuel cell and are able to achieve excellent proton conductivity under a low-humidified condition and excellent mechanical strength and physical durability can be provided.

BRIEF DESCRIPTION OF THE DRAWING

FIG. 1: (M1) to (M4) of FIG. 1 are illustrative diagrams schematically showing modes of phase separation structures in a polymer electrolyte membrane, (M1) showing an example of a co-continuous mode, (M2) showing an example of a lamella mode, (M3) showing an example of a cylinder structure, and (M4) showing an example of a sea-island structure.

DETAILED DESCRIPTION

Our membranes, assemblies and fuel cells will be described hereinafter in detail.

The polymer electrolyte membrane is a polymer electrolyte membrane containing an ionic group-containing polymer electrolyte and a polyazole and is a polymer electrolyte membrane in which a phase separation of 2 nm or larger in which a main component is the polyazole is not observed in transmission type electron microscopic observation. As for a preferred production method for the polymer electrolyte membrane, a method in which a polymer electrolyte composition that contains an ionic group-containing polymer electrolyte and a polyazole are subjected to solution membrane formation can be cited. However, this method does not limit the preferred method.

First, various components that constitute a polymer electrolyte composition and that are raw materials of a polymer electrolyte membrane will be described.

Polyazole

Polyazole, which is one of the components that constitute the polymer electrolyte composition, is a compound that has in its molecule a plurality of azole rings. Among the compounds that have in their molecules a plurality of azole rings, a polymer that contains azole rings in its skeleton is preferably used because it is excellent in chemical stability, heat resistance, and elution resistance. Herein, the azole ring is a five-membered heterocyclic ring that contains one or more nitrogen atoms within the ring. Incidentally, the five-membered heterocyclic ring is allowed to be one that contains oxygen, sulfur or the like, besides nitrogen, as heteroatoms other than carbon.

As azole rings, there can be cited, for example, a pyrrole ring containing only one nitrogen atom as a heteroatom other than a carbon atom and, furthermore, ones having two heteroatoms other than carbon atoms, including an imidazole(1,3-diazole) ring, an oxazole ring, a thiazole ring, a selenazole ring, a pyrazole(1,2-diazole) ring, an isoxazole ring, an isothiazole ring or the like, ones having three heteroatoms, including a 1H-1,2,3-triazole(1,2,3-triazole) ring, a 1H-1,2,4-triazole(1,2,4-triazole) ring, a 1,2,3-oxadiazole(diazoanhydride) ring, a 1,2,4-oxadiazole(diazoanhydride) ring, a 1,2,3-thiadiazole ring, a 1,2,4-thiadiazole ring or the like, ones having four heteroatoms, including a 1H-1,2,3,4-tetrazole(1,2,3,4-tetrazole) ring, a 1,2,3,5-oxatriazole ring, a 1,2,3,5-thiatriazole ring or the like. However, the azole rings are not particularly limited.

Among these azole rings, the imidazole ring, the oxazole ring, the thiazole ring, the selenazole ring, the 1H-1,2,3-triazole(1,2,3-triazole) ring, and the 1H-1,2,4-triazole(1,2,4-triazole) ring are preferable in light of the stability under an acidic condition and the imidazole ring is more preferable in light of being easy to synthesize and able to be used inexpensively.

The azole rings as mentioned above may also be ones that are condensed with an aromatic ring such as a benzene ring. It is preferable to use a compound whose five-membered heterocyclic ring is bonded with a bivalent aromatic group, for example, a p-phenylene group, a m-phenylene group, a naphthalene group, a diphenylene ether group, a diphenylene sulfone group, a biphenylene group, a terphenyl group, a 2,2-bis (4-carboxy phenylene) hexafluoropropane group and the like from the viewpoint of obtaining a heat resistance.

As the polyazoles, there can be cited, for example, polymers such as polyimidazole based compounds, polybenzimidazole based compounds, polybenzo-bis-imidazole based compounds, polybenzo oxazole based compounds, polyoxazole based compound, polythiazole based compounds, polybenzo thiazole based compound. However, the polyazoles are not particularly limited.

Among these polyazoles, polybenzimidazole based compounds, polybenzbisimidazole based compounds, polybenzoxazole based compounds, and polybenzthiazole based compounds are preferable from the viewpoint of heat resistance and workability and the polybenzimidazole based compounds are more preferable in light of being easy to synthesize and able to be used inexpensively.

Although the mechanism of durability improvement has not been sufficiently elucidated, we believe that the following three points are reasons therefor. However, these estimates do not limit this disclosure at all.
(1) Trivalent nitrogen atoms contained in the polyazoles are oxidized to pentavalent N-oxides and therefore function as a peroxide decomposing agent.
(2) Nitrogen atoms contained in the polyazoles and ionic groups contained in the ionic group-containing polymer electrolyte form three-dimensional crosslinks due to intermolecular interactions such as ion complexes and hydrogen bonds so that the mechanical strength of the polymer electrolyte membrane improves and so that the swelling/shrinkage during operation of the fuel cell is restrained and therefore the physical degradation is restrained.
(3) Portions of nitrogen atoms act as ligands for metal ions ($Fe^{2+}$, $Cu^{2+}$ and the like) so that firm complexes are formed, thus functioning also as a metal deactivating agent that accomplishes deactivation.

The polymer electrolyte membrane contains an ionic group-containing polymer electrolyte and a polyazole and in which a phase separation of 2 nm or larger in which the polyazole is a main component is not observed in transmission type electron microscopic observation (hereinafter, sometimes referred to simply as "TEM observation"). Herein, that a phase separation of 2 nm or larger in which the polyazole is a main component is not observed in TEM observation quantitatively expresses a state in which, in the polymer electrolyte membrane, the ionic group-containing polymer electrolyte and the polyazole are uniformly mixed. When a phase separation of 2 nm or larger in which the polyazole is a main component is observed, we believe that because of the swelling/shrinkage of the polymer electrolyte membrane during operation of the fuel cell, an interface portion of the phase separation has a rupture and therefore durability decreases. In addition, because the polyazole and the ionic group-containing polymer electrolyte are in contact only at an interface portion of the phase separation, the advantageous effects of the polyazole decomposing peroxides in the polymer electrolyte cannot be sufficiently obtained and formation of the intermolecular interaction of the polyazole with ionic groups is difficult so that advantageous effects is not sufficiently obtained.

The presence or absence of the phase separation between the polyazole and the ionic group-containing polymer electrolyte in the polymer electrolyte membrane can be checked due to an event in which a phase separation of 2 nm or larger in which the polyazole is a main component is not observed, by a method as follows.

That is, with regard to a cross-section of the polymer electrolyte membrane along a thickness direction, a region of 15 μm×15 μm at an arbitrary location is observed by TEM and the presence or absence and the size of a phase separation is checked. When the ionic group-containing polymer electrolyte and the polyazole are not uniformly mixed but have a phase separation, a state in which black island-shaped particles (island phase or island particles) are dispersed in a gray or white sea phase (continuous phase) is observed in an TEM image in the case where TEM observation is performed without carrying out a staining process. The shape of the island phase (island particles) is a circular shape, an elliptic shape, a polygonal shape, an indeterminate form or the like and is not particularly limited. In the sea/island structure, we believe that the contrast of the black island particles results mainly from the polyazole, and that a white sea (continuous phase) portion mainly results from the ionic group-containing polymer electrolyte. As for the sea phase, a phase separation structure of a lamella mode or a co-continuous mode of white and gray is formed depending on the structure of the polymer or the contrast in the TEM observation, but there is no particular limitation.

That the island phase contains polyazole as a main component is determined by mapping nitrogen contents through the use of energy dispersion type X-ray analysis (EDX) or an electron probe micro-analyzer (EPMA) at the time of observing the phase separation structure by TEM.

As for a concrete method, element analysis is performed at 50 points in the island phase in the sea/island structure to find an inside-island phase average nitrogen amount, and a polyazole concentration in the island phase is calculated as in the following formula. At this time, if the polyazole concentration is 50 wt % or greater, it can be determined that in the island phase, the polyazole is a main component.

Polyazole concentration (wt %)=100×[inside-island phase average nitrogen amount (wt %)−polymer nitrogen amount (wt %)]/[azole nitrogen amount (wt %)−polymer nitrogen amount (wt %)]

The polymer nitrogen amount and the azole nitrogen amount are the amounts of nitrogen contained by the polymer electrolyte and the polyazole, respectively.

As for the weight-average molecular weight of the polyazole, it is preferable that it is greater than or equal to 500 and less than or equal to 300 thousand, and it is more preferable if it is greater than or equal to 500 and less than or equal to 250 thousand, and it is even more preferable if it is greater than or equal to 1000 and less than or equal to 250 thousand. When the weight-average molecular weight is less than 500, it sometimes happens that polyazole bleeds out to the surface of the polymer electrolyte membrane and therefore decreases the electricity generation performance. On the other hand, when the weight-average molecular weight is greater than 300 thousand, the dispersibility of polyazole in the membrane becomes bad so that production of a polymer electrolyte membrane in which the polymer electrolyte and polyazole do not form a phase separation structure that is 2 nm or larger is difficult in some cases.

The polyazole used in the polymer electrolyte membrane is preferred to be a polyazole that does not dissolve in aqueous solutions that contain a strongly acidic substance that has a sulfonic acid group or the like. From this viewpoint, the polyazole is preferable if its solubility in sulfuric acid and water at 60° C. is less than or equal to 100 mg/L, more preferable if it is less than or equal to 20 mg/L, and particularly preferable if it is less than or equal to 4 mg/L. Within such a range, the polyazole does not elute to the outside of the membrane and the advantageous effects thereof can be maintained so that more excellent chemical stability and durability can be obtained.

The polyazole content in the polymer electrolyte membrane can be selected as appropriate by taking into consideration the balance between the electricity generation characteristic and durability and is not limited; however, it is preferred to be greater than or equal to 0.002 wt % and less than or equal to 15 wt % of the entire non-volatile components in the polymer electrolyte membrane. More preferably, it is greater than or equal to 0.01 wt % and less than or equal to 5 wt %. Even more preferably, it is greater than or equal to 0.02 wt % and less than or equal to 3 wt %. If the polyazole content is less than 0.002 wt %, the durability falls short in some cases. Furthermore, if the polyazole content exceeds 15 wt %, the proton conductivity falls short in some cases.

The polyazole is preferred to be a polyazole that does not contain an ionic group. Herein, the ionic group refers to a carboxyl group, a sulfonic acid group, a phosphonic acid group, a hydroxyl group or the like. When the polyazole has an ionic group, the dissolution characteristic thereof in water and acids becomes enhanced so that polyazole elutes to the outside of the membrane and therefore the chemical stability or durability decreases in some cases. Furthermore, because nitrogen atoms and ionic groups contained in the polyazole form salt, the polyazole less easily produces an intermolecular interaction with ionic groups that the ionic group-containing polymer electrolyte has so that advantageous effects such as decomposition of hydrogen peroxide and hydroxy radicals, restraint of swelling/shrinkage, and improvement of mechanical strength, cannot be sufficiently obtained in some cases.

Ionic Group-containing Polymer Electrolyte

Next, the ionic group-containing polymer electrolyte will be described.

The ionic group-containing polymer electrolyte is not limited in structure as long as it contains an ionic group as described below and is able to achieve both electricity generation characteristic and chemical stability; for example, perfluoro based polymers and hydrocarbon based polymers can be cited as representative electrolytes.

The perfluoro based polymer is a polymer in which the hydrogens of the alkyl groups and/or alkylene groups have been mostly or entirely substituted by fluorine atoms. As represent-tative examples thereof, commercially sold products such as Nafion (registered trademark) (made by DuPont company), Flemion (registered trademark) (made by ASAHI GLASS CO., LTD.), and ACPLEX (registered trademark) (made by Asahi Kasei Chemicals Corporation), can be cited. Because these perfluoro based polymers are small in the swelling/shrinkage associated with humidity changes, the breakage of the electrolyte membrane due to humidity changes is unlikely to occur and therefore the perfluoro based polymers can be preferably used.

On the other hand, these perfluoro based polymers are very expensive and have issues of being great in gas crossover. From such viewpoints, using a hydrocarbon based polymer as an ionic group-containing polymer electrolyte is preferable. Furthermore, the hydrocarbon based polymer can be preferably used also in view of mechanical strength, chemical stability and the like. It is more preferable that the hydrocarbon based polymer be a hydrocarbon based polymer having in its main chain an aromatic ring. In particular, a hydrocarbon based polymer that has such sufficient mechanical strength and physical durability as to be used as engineering plastic is preferable. Herein, the aromatic ring may contain not only an aromatic ring made up only of hydrocarbon but also a hetero ring and the like. Furthermore, an aliphatic based unit and a linking group other than the hydrocarbon are allowed to partly make up, together with the aromatic ring unit, the polymer.

As preferable examples of the hydrocarbon based polymer that has in its main chain an aromatic ring, there can be cited polymers such as polysulfone, polyether sulfone, polyphenylene oxide, polyarylene ether based polymer, polyphenylene sulfide, polyphenylene sulfide sulfone, polyparaphenylene, polyarylene based polymer, polyarylene ketone, polyether ketone, polyarylene phosphine oxide, polyether phosphine oxide, polybenzoxazole, polybenzthiazole, polybenzimidazole, aromatic polyamide, polyimide, polyether imide, and polyimide sulfone; however, the preferable examples thereof are not limited these.

From the viewpoints of mechanical strength, the physical durability, and production cost combined, aromatic polyether based polymers are more preferable. Furthermore, in view of having a good packing characteristic of a main chain skeleton structure and a nature of exhibiting very strong intermolecular cohesive force and crystallinity and not dissolving in ordinary solvents and being excellent in tensile strength and elongation, tear strength, and fatigue resistance, aromatic polyether ketone based polymers are particularly preferable. Herein, the aromatic polyether ketone based polymer is a collective term for polymers that have in their main chains at least an aromatic ring, an ether bond, and a ketone bond, and includes aromatic polyether ketone, aromatic polyether ketone ketone, aromatic polyether ether ketone, aromatic polyether ether ketone ketone, aromatic polyether ketone ether ketone ketone, aromatic polyether ketone sulfone, aromatic polyether ketone phosphine oxide, aromatic polyether ketone nitrile and the like.

The ionic group in the ionic group-containing polymer electrolyte is preferred to be groups of atoms that have negative charge and is preferred to be one that has proton exchange capacity. As the functional group described above, a sulfonic acid group, a sulfonimide group, a sulfuric acid group, a phosphonic acid group, a phosphoric acid group, and a carboxylic acid group are preferably used. In particular, having at least a sulfonic acid group, a sulfonimide group, or a sulfuric acid group is more preferable in view of their high proton conductivity and having at least a sulfonic acid group is even more preferable in view of raw material cost.

Furthermore, the ionic group is assumed to include one that is in the form of salt. As for a counter cation in the case where an ionic group forms salt, arbitrary metal cations, $NR_4^+$ (R is an arbitrary organic group) or the like can be cited as examples. Metal cations can be used without being particularly limited in valence or the like. As concrete examples of preferable metal cations, cations of Li, Na, K, Rh, Mg, Ca, Sr, Ti, Al, Fe, Pt, Rh, Ru, Ir, Pd or the like can be cited. In particular, cations of Na, K, and Li, which are inexpensive and capable of easily substituting protons, are preferably used.

The structure of the ionic group-containing polymer electrolyte will be described in detail below. As for a method of introducing an ionic group into that structure, there can be cited a method in which a monomer that has an ionic group is used and polymerized and a method in which an ionic group is introduced by a macromolecular reaction.

As for the method in which a monomer that has an ionic group is used and polymerized, it suffices that a monomer that has an ionic group in a repeating unit is used. Such a method is described in, for example, Jaanaru Obu Mennburenn Saiensu (Journal of Membrane Science), 197, 2002, pp. 231-242. This method facilitates control of the ion exchange capacity of the polymer and is preferable.

As for the method in which an ionic group is introduced by a macromolecular reaction, for example, a method described in Porimaa Purepurinntsu (Polymer Preprints, Japan), 51, 2002, p. 750 or the like will do. Introduction of a phosphoric acid group into an aromatic based macromolecule can be accomplished, for example, by the phosphoric acid esterification of an aromatic based macromolecule that has a hydroxyl group. Introduction of a carboxylic acid group into an aromatic based macromolecule can be accomplished, for example, by oxidizing an aromatic based macromolecule that has an alkyl group or a hydroxyalkyl group. Introduction of a sulfuric acid group into an aromatic based macromolecule can be accomplished, for example, by the sulfuric acid esterification of an aromatic based macromolecule that has a hydroxyl group. For the introduction of a sulfonic acid group into an aromatic based macromolecule, a method described in Japanese Unexamined Patent Publication (Kokai) No. HEI 2-16126 or Japanese Unexamined Patent Publication (Kokai) No. HEI 2-208322 can be used. Concretely, for example, by reacting the aromatic based macromolecule with a sulfonating agent such as a chlorosulfonic acid, in a solvent such as chloroform, or reacting it in concentrated sulfuric acid or fuming sulfuric acid, the aromatic based macromolecule can be sulfonated. The sulfonating agent is not particularly restricted as long as the agent sulfonates the aromatic based macromolecule. That is, besides what have been mentioned, sulfur trioxide or the like can be used. When the aromatic based macromolecule is sulfonated by this method, the degree of sulfonation can be controlled by the amount of the sulfonating agent used, the reaction temperature, and the reaction time. Introduction of a sulfonimide group into an aromatic based macromolecule can be accomplished, for example, by a method in which a sulfonic acid group and a sulfone amide group are reacted.

The molecular weight of the ionic group-containing polymer electrolyte obtained as described above is preferred to be 1 thousand to 5 million in the polystyrene-equivalent weight-average molecular weight and more preferably be 10 thousand to 500 thousand. If it is less than 1 thousand, one of the mechanical strength, the physical durability, and the solvent resistance is insufficient in some cases. For instance, cranking occurs in the formed membrane. On the other hand, if it exceeds 5 million, the dissolution characteristic becomes insufficient and a problem of the solution viscosity becoming high and the workability becoming no good occurs in some cases.

The ionic group-containing polymer electrolyte is preferred to be a block copolymer containing one or more of each of a segment (A1) containing an ionic group and a segment (A2) not containing an ionic group, in view of electricity generation characteristic and proton conductivity in a low-humidified condition. Furthermore, the block copolymer that further has a linker site that connects segments is more preferable. The presence of a linker makes it possible to connect different segments while effectively restraining side reactions.

The number-average molecular weights of the segment (A1) containing an ionic group and the segment (A2) not containing an ionic group is each preferred to be greater than or equal to 5 thousand, more preferably greater than or equal to 10 thousand, and even more preferably greater than or equal to 15 thousand, in view of the balance between the proton conductivity and the physical durability in a low-humidified condition. Furthermore, it is preferably less than or equal to 50 thousand, more preferably less than or equal to 40 thousand, and even more preferably less than or equal to 30 thousand.

When a block copolymer containing one or more of each of the segment (A1) containing an ionic group and the segment (A2) not containing an ionic group is used as an ionic group-containing polymer electrolyte, the block copolymer is preferred to be a block polymer of which the segment (A1) containing an ionic group is represented by general formula (S1) and the segment (A2) not containing an ionic group is represented by general formula (S2).

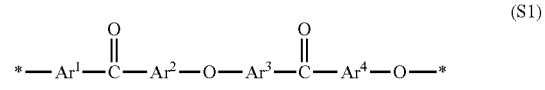

In general formula (S1), $Ar^1$ to $Ar^4$ represent an arbitrary bivalent arylene group and at least one of $Ar^1$ and $Ar^2$ has an ionic group as a substituent. $Ar^3$ and $Ar^4$ may either have or not have an ionic group as a substituent. $Ar^1$ to $Ar^4$ may be arbitrarily substituted with a group other than the ionic group. $Ar^1$ to $Ar^4$ may be the same or different separately for each constitutional unit. * represents a binding site with a constitutional unit of general formula (S1) or one other than that.

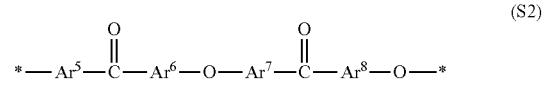

In general formula (S2), $Ar^5$ to $Ar^8$ represent an arbitrary bivalent arylene group and may be substituted but does not have an ionic group. $Ar^5$ to $Ar^8$ may be the same or different separately for each constitutional unit. * represents a binding site with a constitutional unit of general formula (S2) or one other than that.

The block copolymer containing the constitutional units represented by general formulae (S1) and (S2) has all the arylene groups chemically stabilized by electron-attracting ketone groups and, furthermore, an approximately planar structure and therefore achieves good molecular packing, providing crystallinity so that the mechanical strength can be improved. Furthermore, this brings about a reduced glass transition temperature and therefore the softening and increases the physical durability. Thus, this block copolymer is preferable.

As an unsubstituted skeleton of the bivalent arylene group $Ar^1$ to $Ar^8$ in general formulae (S1) and (S2), hydrocarbon based arylene groups, including a phenylene group, a naphthylene group, a biphenylene group, a fluorene-diyl group or the like, heteroarylene groups, including a pyridine diyl, a quinoxaline diyl, a thiophene diyl or the like, can be cited, and preferable is a phenylene group, and more preferable is a p-phenylene group.

As the foregoing segment (A1) containing an ionic group, a constitutional unit that is chemically stable, and that has an increased acidity due to the electron attracting effect, and that has ionic groups introduced at high density is more preferable. Furthermore, as the segment (A2) not containing an ionic group, a constitutional unit that is chemically stable and that exhibits crystallinity, which can possibly provide strong intermolecular cohesive force, is more preferable.

The content rate of the constitutional unit represented by general formula (S1) which is contained in the segment (A1) that contains an ionic group mentioned above is preferred to be greater than or equal to 20 mol % of the segment (A1) containing an ionic group, more preferably greater than or equal to 50 mol %, and even more preferably greater than or equal to 80 mol %. Furthermore, the content rate of the constitutional unit represented by general formula (S2) which is contained in the segment (A2) that does not contain an ionic group is preferred to be greater than or equal to 20 mol % of the segment (A2) not containing an ionic group, more preferably greater than or equal to 50 mol %, and even more preferably greater than or equal to 80 mol %. In the case where the content rate of general formula (S2) contained in the segment (A2) that does not contain an ionic group is less than 20 mol %, the advantageous effects on the mechanical strength, the dimensional stability, and the physical durability achieved by provision of crystallinity fall short in some cases.

As a preferable concrete example of the constitutional unit represented by general formula (S1), a constitutional unit represented by general formula (P2) is cited in view of raw material availability. In particular, in view of raw material availability and polymerizability, a constitutional unit represented by formula (P3) is more preferable and a constitutional unit represented by formula (P4) is even more preferable.

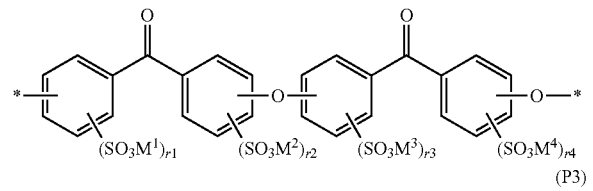
(P2)

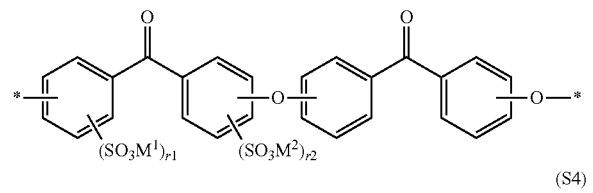
(P3)

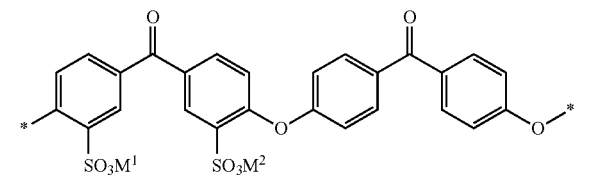
(S4)

In formulae (P2), (P3), and (P4), $M^1$ to $M^4$ represent a hydrogen cation, a metal cation, an ammonium cation $NR_4^+$ (R is an arbitrary organic group) and $M^1$ to $M^4$ may be the same as or different from each other. Furthermore, r1 to r4 are each independently represent an integer of 0 to 4, r1+r2 is an integer of 1 to 8, and r1 to r4 may be different separately for each constitutional unit. * represents a binding site with a constitutional unit of formulae (P2), (P3), or (P4) or one other than that.)

When a block copolymer that contains one or more of each of the segment (A1) containing an ionic group and the segment (A2) not containing an ionic group is used as the ionic group-containing polymer electrolyte, it is preferable that, as for the block copolymer, a molar composition ratio (A1/A2) between the segment (A1) containing an ionic group and the segment (A2) not containing an ionic group be greater than or equal to 0.2, more preferably greater than or equal to 0.33, and even more preferably greater than or equal to 0.5. Furthermore, it is preferred to be less than or equal to 5, more preferably less than or equal to 3, and even more preferably less than or equal to 2. If the molar composition ratio A1/A2 is less than 0.2 or exceeds 5, the proton conductivity in a low-humidified condition falls short or the hot water resistance or the physical durability falls short in some cases.

The ion exchange capacity of the segment (A1) containing an ionic group mentioned above is preferred to be greater than or equal to 2.5 meq/g, more preferably greater than or equal to 3 meq/g, and even more preferably greater than or equal to 3.5 meq/g, in view of the proton conductivity in a low-humidified condition. Furthermore, it is preferred to be less than or equal to 6.5 meq/g, more preferably less than or equal to 5 meq/g, and even more preferably less than or equal to 4.5 meq/g. If the ion exchange capacity of the segment (A1) containing an ionic group is less than 2.5 meq/g, the proton conductivity in a low-humidified condition falls short in some cases. If it exceeds 6.5 meq/g, the hot water resistance or the physical durability falls short in some cases.

The ion exchange capacity of the segment (A2) not containing an ionic group mentioned above is preferred to be low and be less than or equal to 1 meq/g, more preferably less than or equal to 0.5 meq/g, and even more preferably less than or equal to 0.1 meq/g, in view of the hot water resistance, the mechanical strength, the dimensional stability, and the physical durability. If the ion exchange capacity of the segment (A2) not containing an ionic group exceeds 1 meq/g, the hot water resistance, the mechanical strength, the dimensional stability, or the physical durability falls short in some cases.

When the ionic group-containing polymer electrolyte is a block copolymer containing one or more of each of the segment (A1) containing an ionic group and the segment (A2) not containing an ionic group and where the segment (A1) containing an ionic group in the block copolymer has a sulfonic acid group, the ion exchange capacity is preferred to be greater than or equal to 0.1 meq/g and less than or equal to 5 meq/g in view of the balance between the proton conductivity and the water resistance, and this lower limit is more preferably greater than or equal to 1.5 meq/g and even more preferably greater than or equal to 2 meq/g. The upper limit is more preferably less than or equal to 3.5 meq/g and even more preferably less than or equal to 3 meq/g. When the ion exchange capacity is less than 0.1 meq/g, the proton conductivity falls short in some cases. When it is greater than 5 meq/g, the water resistance falls short in some cases.

The ion exchange capacity is a value found by a neutralization titration method. The neutralization titration method is performed as follows. Incidentally, measurement is performed three or more times and an average value thereof is taken.

(1) After a membrane surface of an electrolyte membrane having been subjected to proton substitution and having been washed thoroughly with pure water is wiped to remove moisture, vacuum drying is performed at 100 □ C for 12 hours or longer and then the dry weight thereof is determined.
(2) 50 mL of a 5 wt % sodium sulfate aqueous solution is added to the electrolyte, and the mixture is left standing still for 12 hours followed by ion exchange.
(3) The produced sulfuric acid is titrated by using a 0.01 mol/L sodium hydroxide aqueous solution. As an indicator reagent, 0.1 w/v % of a commercially sold phenolphthalein solution for titration is added. The point at which a light reddish purple develops is determined as the end point.
(4) The ion exchange capacity is found by the following formula.

Ion exchange capacity (meq/g)=[concentration of sodium hydroxide aqueous solution (mmol/ml)× titrated amount (ml)]/dry weight of sample (g)

The synthesis methods for the segment (A1) containing an ionic group and the segment (A2) not containing an ionic group are not particularly limited as long as they are a method whereby a substantially sufficient molecular weight is obtained. For example, the synthesis can be accomplished by using the aromatic nucleophilic substitution reaction between an aromatic active dihalide compound and a bivalent phenol compound or the aromatic nucleophilic substitution reaction of a halogenated aromatic phenol compound.

As for the aromatic active dihalide compound for use in the synthesis of the segment (A1) containing an ionic group, it is preferable that a compound obtained by introducing an ionic group into an aromatic active dihalide compound be used as a monomer in view of the chemical stability and the production cost and in view that the amount of the ionic groups can be accurately controlled. As ionic groups that are preferably introduced into such monomers, there can be cited a sulfonic acid group, a phosphonic acid group, and a sulfonimide group.

As preferable concrete examples of the monomers that have a sulfonic acid group as the ionic group, there can be cited 3,3'-disulfonate-4,4'-dichlorodiphenyl sulfone, 3,3'-disulfonate-4,4'-difluorodiphenyl sulfone, 3,3'-disulfonate-4,4'-dichlorodiphenyl ketone, 3,3'-disulfonate-4,4'-difluorodiphenyl ketone, 3,3'-disulfonate-4,4'-dichlorodiphenyl phenyl phosphine oxide, 3,3'-disulfonate-4,4'-difluorodiphenyl phenyl phosphine oxide or the like. In particular, in view of the chemical stability and the physical durability, 3,3'-disulfonate-4,4'-dichlorodiphenyl ketone and 3,3'-disulfonate-4,4'-difluorodiphenyl ketone are more preferable and, in view of the polymerization activity, 3,3'-disulfonate-4,4'-difluorodiphenyl ketone is even more preferable.

As preferable concrete examples of the monomers that have a phosphonic acid group, there can be cited 3,3'-diphosphonate-4,4'-dichlorodiphenyl sulfone, 3,3'-diphosphonate-4,4'-difluorodiphenyl sulfone, 3,3'-diphosphonate-4,4'-dichlorodiphenyl ketone, 3,3'-diphosphonate-4,4'-difluorodiphenyl ketone, 3,3'-diphosphonate-4,4'-dichlorodiphenyl phenyl phosphine oxide, 3,3'-diphosphonate-4,4'-difluorodiphenyl phenyl phosphine oxide or the like.

As preferable concrete examples of the monomers that have a sulfonimide group, there can be cited 5,5'-carbonyl-bis-(2-fluoro-N-(phenylsulfonyl)benzenesulfonamide), 5,5'-carbonyl-bis-(2-chloro-N-(phenylsulfonyl)benzenesulfonamde), 5,5'-sulfonylbis(2-fluoro-N-(phenylsulfonyl)benzenesulfonamide), 5,5'-sulfonyl bis(2-chloro-N-(phenylsulfonyl)benzenesul-fonamide), 5,5'-(phenylphosphoryl)bis (2-fluoro-N-(phenylsulfonyl)benzenesulfonamide), 5,5'-(phenylphosphoryl)bis(2-chloro-N-(phenylsulfonyl)benzenesulfonamide) or the like.

Furthermore, as aromatic active dihalide compounds not having an ionic group for use for the synthesis of the segment (A1) containing an ionic group and the segment (A2) not containing an ionic group, there can be cited 4,4'-dichlorodiphenyl sulfone, 4,4'-difluorodiphenyl sulfone, 4,4'-dichlorodiphenyl ketone, 4,4'-difluorodiphenyl ketone, 4,4'-dichlorodiphenyl phenyl phosphine oxide, 4,4'-difluorodiphenyl phenyl phosphine oxide, 2,6-dichlorobenzonitrile, 2,6-difluorobenzonitrile or the like. In particular, 4,4'-dichlorodiphenyl ketone and 4,4'-difluorodiphenyl ketone are more preferable in view of provision of crystallinity, the mechanical strength, the physical durability, and the hot water resistance, and 4,4'-difluorodiphenyl ketone is the most preferable in view of the polymerization activity. These aromatic active dihalide compounds can be used alone but can also be used in combination with a plurality of aromatic active dihalide compounds.

Furthermore, as a monomer not having an ionic group for use for the synthesis of the segment (A1) containing an ionic group and the segment (A2) not containing an ionic group, a halogenated aromatic hydroxy compound can be cite. This compound copolymerizes with the aromatic active dihalide compound, whereby the segment can be synthesized. Although the halogenated aromatic hydroxy compound is not particularly restricted, 4-hydroxy-4'-chlorobenzophenone, 4-hydroxy-4'-fluorobenzophenone, 4-hydroxy-4'-chlorodiphenyl sulfone, 4-hydroxy-4'-fluorodiphenyl sulfone, 4-(4'-hydroxybiphenyl) (4-chlorophenyl)sulfone, 4-(4'-hydroxybiphenyl) (4-fluorophenyl)sulfone, 4-(4'-hydroxybiphenyl) (4-chlorophenyl)ketone, 4-(4'-hydroxybiphenyl) (4-fluorophenyl)ketone or the like can be cited as examples. These can be used alone and can also be used as a mixture of two or more species. Furthermore, in the reaction of an activated dihalogenated aromatic compound and an aromatic dihydroxy compound, these halogenated aromatic hydroxy compounds may be reacted together to synthesize aromatic polyether based compounds.

The synthesis method for the foregoing block copolymer is not particularly limited as long as it is a method whereby a substantially sufficient molecular weight can be obtained; for example, the synthesis can be accomplished by utilizing the aromatic nucleophilic substitution reaction between the segment containing an ionic group and the segment not containing an ionic group.

As for the aromatic nucleophilic substitution reaction performed to obtain segments of the foregoing block copolymer or a block copolymer, the foregoing monomer mixture and the segment mixture can be reacted in the presence of a basic compound. The polymerization can be performed in the temperature range of 0 to 350° C. However, the temperature is preferred to be 50 to 250° C. When the temperature is lower than 0° C., the reaction does not progress sufficiently. When the temperature is higher than 350° C., decomposition of the polymer begins to occur in some cases.

The polymerization reaction can be conducted without any solvent but is preferably conducted in a solvent. As solvents that can be used, nonprotic polar organic solvents such as N,N-dimethyl acetamide, N,N-dimethylformamide, N-methyl-2-pyrrolidone, dimethyl sulfoxide, sulfolane, 1,3-dimethyl-2-imidazolidinone, and hexamethylphosphontriamide, and the like can be cited. However, the solvents that can be used are not limited to these solvents but a solvent that can be used as a stable solvent for the aromatic nucleophilic substitution reaction suffices. These organic solvents may be used alone or as a mixture of two or more species.

As basic compounds for use in the aromatic nucleophilic substitution reaction, there can be cited sodium hydroxide, potassium hydroxide, sodium carbonate, potassium carbonate, sodium hydrogen carbonate, potassium hydrogen carbonate or the like. However, basic compounds that can cause aromatic diols to have an active phenoxide structure can be used without being limited to the foregoing compounds. Furthermore, to increase the nucleophilicity of phenoxide, it is also preferable to add a crown ether such as 18-crown-6. These crown ethers coordinate to sodium ions or potassium ions in sulfonic acid groups and result in improvement of the dissolution characteristic in an organic solvent in some cases and therefore can be preferably used.

In the aromatic nucleophilic substitution reaction, water is produced as a secondary product in some cases. On such an occasion, by causing toluene or the like to co-exist in the reaction system, irrespective of the polymerization solvent, water can be removed as an azeotrope to the outside of the system. As a method of removing water to the outside of the system, a water absorbent such as Molecular Sieve, can be used.

The azeotropic agent that is used to remove the reaction water or the water introduced during the reaction is generally an arbitrary inert compound that substantially does not interfere with the polymerization and that co-distills with water and that boils at about 25° C. to about 250° C. The azeotropic agents usually used include benzene, toluene, xylene, chlorobenzene, methylene chloride, dichlorobenzene, trichlorobenzene, cyclohexane or the like. Of course, it is useful to choose an azeotropic agent whose boiling point is lower than the boiling point of the bipolar solvent used. Although an azeotropic agent is usually used, the agent is not always necessary when high reaction temperature, for example, a temperature of 200° C. or higher, is employed and, particularly, when an inert gas is continually sprayed to the reaction mixture. Generally, it is desirable that the reaction be carried out in a state in which oxygen is not present in an inert atmosphere.

When the aromatic nucleophilic substitution reaction is conducted in a solvent, it is preferable to charge a monomer so that the obtained polymer concentration is 5 to 50 wt %. If the obtained polymer concentration is less than 5 wt %, the degree of polymerization does not readily increase in some cases. On the other hand, if it is greater than 50 wt %, the viscosity of the reaction system becomes excessively high and the post-processing of the reactant becomes difficult in some cases.

After the polymerization reaction ends, the solvent is removed from the reaction solution by evaporation and, according to need, the residual is washed so that a desired polymer is obtained. Furthermore, the reaction solution is added into a solvent in which the solubility of the polymer is low and the solubility of a secondarily produced inorganic salt is high to remove the inorganic salt and precipitate the polymer as a solid so that the polymer can be obtained by filtering out the precipitate. The collected polymer, as the case may be, is washed with water, alcohol, or another solvent and then dried. With a desired molecular weight obtained, the halide or phenoxide terminal groups, as the case may be, can be reacted by introducing a phenoxide or halide terminal sealing agent that causes formation of a stable terminal group.

Polymer Electrolyte Membrane

When the block copolymer is used as the ionic group-containing polymer electrolyte in the polymer electrolyte membrane, polyazole can be concentratedly disposed in a hydrophilic domain formed by the segment (A1) that contains an ionic group or a hydrophobic domain formed by the segment (A2) that does not contain an ionic group, by appropriately selecting the polarity (hydrophilicity or hydrophobicity) of the polyazole.

Hydroxy radicals and hydrogen peroxide, which are usually high in hydrophilicity, are considered to exist in the hydrophilic domain formed by the segment (A1) that contains an ionic group and cut the segment. Therefore, application of a hydrophilic polyazole is effective to stabilize the segment (A1) that contains an ionic group. When achievement of such an advantageous effect is purposed, it is preferable that the polyazole concentration in the hydrophilic domain be at least twice the polyazole concentration in the hydrophobic domain. The polyazole concentration in each domain is determined by mapping nitrogen contents through the use of an energy dispersion type X-ray analysis (EDX) or an electron probe micro-analyzer (EPMA) when the phase separation structure is observed by TEM.

As a concrete method, element analysis is performed at 50 points in each of a hydrophilic domain and a hydrophobic domain to find an inside-domain average nitrogen amount so that the polyazole concentration in each domain can be calculated according to the following formula.

Polyazole concentration (wt %)=100×[inside-domain average nitrogen amount (wt %)−polymer nitrogen amount (wt %)]/[azole nitrogen amount (wt %)−polymer nitrogen amount (wt %)]

The polymer nitrogen amount and the azole nitrogen amount are the amounts of nitrogen contained in the polymer electrolyte and the polyazole, respectively.

On the other hand, the hydrophobic domain formed by the segment (A2) that does not contain an ionic group is a component responsible for the mechanical strength and therefore we believe that disposal of hydrophobic polyazole has an advantageous effect of improving the physical durability. It is also preferable that the hydrophilic polyazole and hydrophobic polyazole be used together according to need.

In the polymer electrolyte membrane, when the ionic group-containing polymer electrolyte that constitutes the polymer electrolyte membrane is a block copolymer that contains one or more of each of the segment (A1) containing an ionic group and the segment (A2) not containing an ionic group, it is preferable that a hydrophilic domain constituted by the segment (A1) that contains an ionic group and a hydrophobic domain constituted by the segment (A2) that does not contain an ionic group have a phase separation structure of a co-continuous mode or a lamella mode. Such a phase separation structure can be developed in a block copolymer made up of two or more incompatible kinds of segments or the like, and their structural forms can be roughly divided into four modes of a co-continuity (M1), a lamella (M2), a cylinder (M3), and a sea-island (M4) (FIG. 1).

In the polymer electrolyte membrane that contains an ionic group-containing macromolecular compound, it often happens that the phase separation structure is formed of a hydrophilic domain made up of a component that contains an ionic group and a hydrophobic domain made up of a component that does not contain an ionic group. In (M1) to (M4) of the FIGURE, a continuous phase of a light color is formed by a domain selected from the hydrophilic domain and the hydrophobic domain, and a continuous phase or dispersed phase of a dark color is formed by the other domain. Particularly, in a phase separation structure made up of the co-continuity (M1) and the lamella (M2), the hydrophilic domain and the hydrophobic domain both form a continuous phase.

Such a phase separation structure is described in, for example, Anyuaru Rebyuu Obu Fijical Kemisutorii (Annual Review of Physical Chemistry), 41, 1990, p. 525, or the like. By controlling the structures and the compositions of compounds that constitute the hydrophilic domain and compounds that constitute the hydrophobic domain, excellent proton conductivity can be realized even in a low-humidified and low-temperature condition as well. Particularly, when the structure is a structure made up of (M1) and (M2) shown in the FIGURE, that is, the co-continuous mode (M1) and the lamella mode (M2), continuous proton-conducting channels are formed so that a polymer electrolyte forming excellent in proton conductivity can be obtained. At the same time, a polymer electrolyte membrane having very excellent fuel blocking characteristic, solvent resistance, mechanical strength, and physical durability due to the crystallinity of the hydrophobic domain can be realized. In particular, a phase separation structure of the co-continuous mode (M1) is particularly preferable.

On another hand, in a phase separation structure of (M3) and (M4) shown in the FIGURE, that is, the cylinder structure (M3) and the sea-island structure (M4), too, we believe that a continuous proton-conducting channel can be formed. However, both structures are structures constructed when the ratio of the components that constitute the hydrophilic domain is relatively small compared to the components that constitute the hydrophobic domain or when the ratio of the components that constitute the hydrophobic domain is relatively small in comparison with the components that constitute the hydrophilic domain. When the ratio of the components that constitute the hydrophilic domain is relatively small in comparison with the components that constitute the hydrophobic domain, the amount of the ionic groups responsible for proton conduction becomes absolutely reduced so that, particularly in the sea-island structure, a continuous proton-conducting channel itself is not formed and therefore the proton conductivity is poor. When the ratio of the components that constitute the hydrophobic domain is relatively small in comparison with the components that constitute the hydrophilic domain, although the proton conductivity is excellent, the crystalline hydrophobic domain is small so that the fuel blocking characteristic, the solvent resistance, the mechanical strength, and the physical durability are poor and the advantageous effects are not sufficiently obtained in some cases.

Herein, the domain means a mass formed by aggregation of similar substances or segments in a forming.

That the ionic group-containing polymer electrolyte has a phase separation structure of the co-continuous mode (M1) and the lamella mode (M2) can be confirmed if a desired image is observed by the following technique. With regard to a three-dimensional diagram of the polymer electrolyte membrane obtained by TEM tomography observation, three digital slice views cut out from three directions of length, breadth, and height are compared. For example, in the polymer electrolyte membrane made up of a block copolymer that has one or more of each of the segment (A1) containing an ionic group and the segment (A2) not containing an ionic group, when the phase separation structure is of the co-continuous mode (M1) or the lamella mode (M2), both the hydrophilic domain that contains (A1) and the hydrophobic domain that contains (A2) form a continuous phase in all the three views.

On another hand, in the cylinder structure (M3) or the sea-island structure (M4), one of the foregoing domains does not form a continuous phase in at least one view so that this can be distinguished from the former. Furthermore, a structure can be determined from the patterns that the three views individually show. Concretely, in the co-continuous structure, a pattern in which the continuous phases are intertwined is exhibited whereas in the lamella structure, a pattern of linkage in a layered fashion is exhibited. Herein, the continuous phase means a phase in which individual domains are not isolated but linked in a macroscopic view; however, there may be portions in which linkage is partially absent.

Particularly, to clarify the aggregation state and the contrast of the segment (A1) containing an ionic group and the segment (A2) not containing an ionic group, the polymer electrolyte membrane is immersed in a 2 wt % lead acetate aqueous solution for 2 days, whereby the ionic groups are ion-exchanged with lead. After that, the polymer electrolyte membrane is subjected to a transmission electron microscope (TEM) and TEM tomography observation.

The block copolymer used as an ionic group-containing polymer (A) is preferred to be one in which a phase separation structure is observed in a TEM observation performed at a magnification of 50 thousand times and whose average interlayer distance or average interparticle distance measured by image processing is greater than or equal to 5 nm and less than or equal to 500 nm. In particular, the average interlayer distance or the average interparticle distance is more preferably greater than or equal to 10 nm and less than or equal to 50 nm and most preferably greater than or equal to 15 nm and less than or equal to 30 nm. When a phase separation structure is not observed by the transmission type electron microscope or the average interlayer distance or the average interparticle distance is less than 5 nm, the continuity of ion channels falls short and the conductivity falls short in some cases. Furthermore, when the interlayer distance exceeds 500 nm, the mechanical strength or the dimensional stability becomes no good in some cases.

It is preferable that the block polymer used as an ionic group-containing polymer (A) have crystallinity while having a phase separation structure. It is preferable that a crystallinity be recognized by a differential scanning calorimetry method (DSC) or wide-angle X-ray diffraction. Concretely, it is preferable that the amount of crystallization heat measured by the differential scanning calorimetry method be greater than or equal to 0.1 J/g or that the degree of crystallinity measured by the wide-angle X-ray diffraction be greater than or equal to 0.5%. Incidentally, "have crystallinity" means that the polymer can be crystallized when the polymer's temperature increases, has a property of being able to crystallize, or has already crystallized. Furthermore, non-crystalline polymer means a polymer which is not a crystalline polymer and whose crystallization substantially does not progress. Therefore, even when a polymer is a crystalline polymer but its crystallization has not sufficiently progressed, the state of the polymer is a non-crystalline state in some cases.

In the polymer electrolyte membrane, it is also preferable that the ionic group-containing polymer electrolyte and the polyazole form an intermolecular interaction at their portions of ionic groups and nitrogen atoms. Generally, hydrogen peroxide and hydroxy radicals are high hydrophilic compounds and, in the electrolyte membrane, easily diffuse into the vicinity of ionic groups where the hydrophilicity is high and the water concentration is high. Therefore, because the ionic group-containing polymer electrolyte membrane and the polyazole form an intermolecular interaction at their portions of ionic groups and nitrogens, hydrogen peroxide and hydroxy radicals diffusing into the vicinity of the ionic groups are decomposed. Thus, it becomes possible to further improve the chemical stability of the polymer electrolyte membrane. Furthermore, because the ionic group-containing polymer electrolyte membrane and the polyazole have an intermolecular interaction, three-dimensional crosslinks are formed, making it possible to restrain the swelling/shrinkage resulting from changes in humidity and also improve the mechanical strength.

As for concrete examples of the intermolecular interaction, there can be cited an ion complex, a hydrogen bond, a dipole interaction, Van der Waals force and the like but there is no particular limitation. In particular, it is preferable that ion complexes, hydrogen bonds, and dipole interactions be formed, and it is more preferable that ion complexes and hydrogen bonds be formed, and it is particularly preferable that ion complexes be formed. As the intermolecular interactions acting between ionic groups and nitrogen atoms provide stronger forces, polyazoles are more concentrated in the vicinities of the ionic groups and can improve the rate of decomposition of hydrogen peroxide and hydroxy radicals that diffuse. Furthermore, as the intermolecular interactions provide stronger forces, the crosslinks between the ionic group-containing polymer and the polyazole is stronger so that the swelling/shrinkage of the polymer electrolyte membrane can be restrained and the mechanical strength thereof can be improved.

Whether or not the foregoing intermolecular interaction is occurring can be checked by using a Fuurie Hennkann Sekigaibunnkoukei (Fourier-transform infrared spectrometer) (hereinafter, sometimes referred to simply as "FT-IR").

In the case where the polymer electrolyte membrane of the example is measured by using an FT-IR, if a spectrum in which there is a shift from a normal peak position of the polymer electrolyte or a normal peak position of the polyazole based compound is observed, it can be determined that a portion of the polymer electrolyte has formed an intermolecular interaction with a portion of the polyazole based compound.

The polyazole, in view of convenience in processing and restraint of formation of a phase separation structure, is preferred to be one that dissolves in general-purpose organic solvents, including hydrocarbon based organic solvents, including hexane, benzene, toluene, xylene or the like, alcohol based organic solvents, including methanol, ethanol, isopropyl alcohol or the like, ester based organic solvents, including ethyl acetate, butyl acetate or the like, ketone based organic solvents, including acetone, methyl ethyl ketone, methyl isobutyl ketone or the like, ether based organic solvents, including diethyl ether, tetrahydrofuran or the like, nonprotic polar organic solvents, including dimethylformamide, dimethyl acetamide, dimethyl imidazolidinone, dimethyl sulfoxide, N-methyl-2-pyrrolidone or the like. Use of a general-purpose organic solvent capable of dissolving polyazole makes it possible to obtain a uniform solution with the ionic group-containing polymer so that formation of a phase separation structure with the ionic group-containing polymer electrolyte can be restrained.

Whether or not the polyazole forms a homogeneous solution can be checked by the following method. That is, that can be checked by preparing a 0.5 wt % solution of polyazole and measuring a particle diameter distribution through the use of a dynamic light scattering method (hereinafter, sometimes referred to simply as DLS). As for the particle diameter of the polyazole in the solution, it suffices that the arithmetic average particle diameter is 10 nm or less, with 5 nm or less being preferable and 2 nm or less being more preferable. A solution in which a particle whose particle size exceeds 2 nm is not identified can be particularly preferably used.

The polyazole generally has low dissolution characteristic with respect to solvents. Therefore, to obtain a uniform composition thereof with an ionic group-containing polymer electrolyte, there is a need to make the polyazole soluble in the polymer solution. The method of such solubilization is not particularly limited. However, it is preferable to apply (1) a spray drying method, (2) alkali dissolution, or (3) molecular weight reduction. It is more preferable to apply (1) the spray drying method or (2) the alkali dissolution, and it is even more preferable to apply (1) the spray drying method.

The spray drying method of (1) mentioned above is a method in which a solution of a target substance is sprayed as fine particles of several hundred μm or less into a stream of high-temperature air or nitrogen gas or in a decompression chamber to instantaneously dry. Application of this method allows an amorphous porous body of polyazole to be obtained and enables the polyazole, which is usually insoluble or less easily soluble, to be more easily dissolved at high concentration by stirring at normal temperature.

The alkali dissolution of (2) mentioned above is a method of solubilizing the polyazole by reacting the polyazole and an alkali metal hydroxide to form a salt. As for methods for reacting polyazole and an alkali metal hydroxide, there can be cited a method in which the polyazole is mixed in a solution obtained by dissolving the alkali metal hydroxide in a protic solvent made up of a mixture of water and an organic solvent such as methanol, ethanol, n-propanol, isopropyl alcohol, butanol, or glycerin or the like, but there is no particular limitation. By applying this method, the polyazole forms a salt to be able to be dissolved in a polar organic solvent such as dimethyl sulfoxide or N-methyl-2-pyrrolidone.

As for the molecular weight reduction of (3) mentioned above, what molecular weight the polyazole to be used needs to have varies depending on the structure of the polyazole. For example, in polybenzimidazole, which is a kind of polyazole, one whose molecular weight is greater than or equal to 1000 and less than or equal to 10 thousand in terms of weight-average molecular weight is preferably used. By applying a compound relatively low in molecular weight, the interaction between additive molecular chains can be reduced and the polyazole can be solubilized.

When the spray drying method of (1) mentioned above is applied, it is preferable to further apply a step 1 to a step 3 as follows to produce a polymer electrolyte membrane. That is, the step 1 is a step in which a polyazole particle is manufactured by using the spray drying method, the step 2 is a step in which an ionic group-containing polymer electrolyte, the polyazole particle, and an organic solvent capable of dissolving both the ionic group-containing polymer electrolyte and the polyazole particle are mixed to prepare a uniform electrolyte composition solution, and the step 3 is a step in which the electrolyte composition solution is subjected to solution membrane formation.

As for the step 1, although there is a need to prepare a polyazole solution to be subjected to the spray drying, the polyazole is generally very low in dissolution characteristic and preparation of a solution thereof by a method in which the polyazole is mixed and stirred with an organic solvent has been difficult.

We use of an autoclave has made it possible to prepare a dilute solution of the polyazole to be subjected to the spray drying. That is, polyazole and an organic solvent are placed in an autoclave container and, after the container is tightly sealed, are heated, whereby it has become possible to prepare a dilute solution of the polyazole.

The organic solvent used in the preparation step for the dilute solution of the polyazole is not particularly limited but can be selected as appropriate according to the structure of the polyazole as long as the organic solvent can dissolve the polyazole. However, usually, the polyazole is low in dissolution characteristic so that organic solvents that can be used are limited. The organic solvent is preferred to be an organic solvent selected from the group consisting of nonprotic polar organic solvents, including N,N-dimethylacetamide, N,N-dimethylformamide, N,N'-dimethyl imidazolidinone, N-methyl-2-pyrrolidone, dimethyl sulfoxide or the like, and mixtures thereof.

The heating temperature in the autoclave is not particularly limited as long as it can cause the polyazole to be dissolved. However, it is preferred to be greater than or equal to the boiling point of the organic solvent of the dilute polyazole solution and less than or equal to 300° C. If the heating temperature is not as high as the boiling point of the organic solvent, the pressure in the autoclave is low and the dissolution of the polyazole is insufficient in some cases. Furthermore, if the heating temperature exceeds 300° C., the dissolution velocity of the polyazole becomes fast but the organic solvent or the polyazole changes in quality and decomposes so that the advantageous effects cannot be sufficiently obtained in some cases.

The inlet temperature of the spray drying is preferred to be greater than or equal to 100° C. and less than or equal to 250° C. and, more preferably, greater than or equal to 150° C. and less than or equal to 220° C. When the inlet temperature is less than 100° C., the evaporation of the organic solvent becomes insufficient and a polyazole particle cannot be obtained in some cases. When the inlet temperature is higher than 250° C., the organic solvent or the polyazole changes in quality and decompose and, therefore, the advantageous effects cannot be sufficiently obtained in some cases.

The outlet temperature of the spray drying is preferably less than or equal to 100° C. and, more preferably, less than or equal to 60° C. When the outlet temperature is higher than 100° C., generated polyazole particles become large in size in some cases. The lower limit of the outlet temperature is not particularly limited but is often about 0° C. to 40° C. due to the specifications of the apparatus. The polyazole particle manufactured as described above is preferred to be such a polyazole particle that a particle that exceeds 2 nm in particle diameter is not recognized in the particle diameter distribution measured by the foregoing dynamic light scattering method.

In the step 2, the preparation can be made by mixing the ionic group-containing polymer electrolyte with the polyazole particle and an organic solvent capable of dissolving the two materials at a predetermined proportion and mixing the mixture by a conventionally known method, for example, by using a mixer such as a homomixer, a homodisper, a wave rotor, a homogenizer, a disperser, a paint conditioner, a ball mill, a magnetic stirrer, or a mechanical stirrer. As for the rotation speed of a rotary type mixing machine, there is no particular restriction as long as a uniform electrolyte composition solution can be prepared; however, from the viewpoint of production efficiency, 50 rotations/min or greater is preferable, 100 rotations/min or grater is more preferable, and 200 rotations/min or greater is even more preferable. The rotation speed does not have a particular upper-limit value. In reality, however, it is often the case that 20,000 rotations/min or 30,000 rotations/min is a limit in the performance of a mixing machine. Furthermore, as for the time of mixing by the mixing machine, there is no particular restriction as long as a uniform electrolyte composition solution can be prepared. However, 1 minute or longer is preferable, 10 minutes or longer is more preferable, and 1 hour or longer is even more preferable. When the rotation speed or the mixing time at the time of mixing is insufficient, it sometimes happens that a uniform electrolyte composition solution of the polymer electrolyte and the polyazole particle cannot be obtained and, as a result, the polymer electrolyte and the polyazole form a phase separation structure larger than 2 nm so that sufficient durability cannot be obtained.

Furthermore, in the step 2, a method in which a polymer electrolyte solution in which the ionic group-containing polymer electrolyte has been dissolved in the organic solvent and a polyazole solution in which the polyazole particle has been dissolved in the organic solvent are separately prepared and the polymer electrolyte solution and the polyazole solution are mixed to prepare a uniform electrolyte composition solution can also be preferably used. Because the polymer electrolyte solution and the polyazole solution are separately prepared beforehand, it becomes possible to more easily and conveniently disperse the ionic group-containing polymer electrolyte and the polyazole uniformly in the solution. As a result, the polymer electrolyte and the polyazole are less likely to form a phase separation structure so that the quality of the polymer electrolyte membrane improves.

As for the organic solvent for preparing the electrolyte composition solution, one that can dissolve the ionic group-containing polymer electrolyte and the polyazole particle and then be removed suffices. For example, nonprotic polar organic solvents, including N,N-dimethylacetamide, N,N-dimethylformamide, N-methyl-2-pyrrolidone, dimethyl sulfoxide, 1,3-dimethyl-2-imidazolidinone or the like, ester based organic solvents, including γ-butyrolactone, butyl acetate or the like, carbonate based organic solvents, including ethylene carbonate, propylene carbonate or the like, alkylene glycol monoalkyl ethers, including ethylene glycol monomethyl ether, ethylene glycol monoethyl ether, propylene glycol monomethyl ether, propylene glycol monoethyl ether or the like, alcohol based organic solvents, including isopropyl alcohol or the like, or mixtures of water and these solvents can be preferably used. However, nonprotic polar organic solvents are the highest in dissolution characteristic and the most preferable.

The solution membrane formation of the step 3 is not particularly limited as long as the solution membrane formation applies the electrolyte composition solution produced in the step 2 in a membrane form so that a polymer electrolyte membrane can be obtained. As for a preferable one, a method in which after the electrolyte composition solution is applied in a membrane form by flow-casting it on a supporter, the aforementioned organic solvent is removed is indicated as an example.

As for the method of flow-casting the electrolyte composition solution on the supporter, known methods can be used but it is preferable to flow-cast the solution having a constant concentration to make a constant thickness. For example, a method in which the solution is pushed into a space having a constant gap so that the thickness of the membrane formed by flow casting is made constant, as in a doctor blade, an applicator, a bar coater, a knife coater and the like, a method in which the electrolyte composition solution is supplied at a constant rate to flow-cast it by using a slit die or the like, a method in which a gravure roll is used to transfer a constant amount of the electrolyte composition solution onto the supporter can be cited. The flow casting onto the supporter may be performed in a batch method; however, continuous performance thereof is better in productivity and therefore preferable.

The supporter onto which to flow-cast the electrolyte composition solution is not particularly limited as long as it does not dissolve in the organic solvent of the electrolyte composition solution. For example, films of resins, including polyethylene terephthalate, polybutylene terephthalate, polyethylene naphthalate, polyalylate, polyamide, polyimide, polyamide-imide, polyaramid, polybenzasole or the like, films obtained by coating a surface of one of the foregoing films with an inorganic compound such as silica, titania, or zirconia, films made up of metal materials, including stainless steel and the like, glass substrates or the like can be cited. In light of heat resistance and solvent resistance, polyethylene terephthalate, polybutylene terephthalate, polyethylene naphthalate, polyalylate, polyamide, polyimide, polyaramid, and glass substrates are preferable.

The solid content concentration of the electrolyte composition solution for use in the solution membrane formation of the step 3 can be determined as appropriate depending on the molecular weight of the ionic group-containing polymer electrolyte, the temperature at the time of flow casting and the like, and is preferred to be greater than or equal to 5 wt % and less than or equal to 50 wt %. If the solid content concentration is less than 5 wt %, a time is required for the removal of the solvent performed in a subsequent step so that the quality level of the membrane decreases or the solvent content in the membrane cannot be appropriately controlled in some cases. If it exceeds 50 wt %, it sometimes happens that the viscosity of the solution becomes excessively high and the handling thereof becomes difficult. More preferably, the solid content concentration is greater than or equal to 5 wt % and less than or equal to 35 wt %.

The viscosity of the electrolyte composition solution is not particularly limited but is preferred to be within a range such that the electrolyte composition solution can be favorably flow-cast on the supporter. More preferably, at the flow-casting temperature, the viscosity is greater than or equal to 1 Pa·s and less than or equal to 1000 Pa·s.

The method of removing the organic solvent from the membrane obtained by flow-casting the electrolyte composition solution is not particularly limited. For example, a method in which the membrane obtained by flow casting is heated to evaporate the organic solvent can be cited. The content rate of the solvent in the polymer electrolyte membrane obtained by heating the membrane obtained by the flow casting is preferred to be 50 wt % or less, more preferably 30 wt % and even more preferably 10 wt % or less. If the content rate thereof is more than 50 wt %, the swelling characteristic of the polymer electrolyte membrane becomes great in some cases.

The heating temperature at which the membrane obtained by flow casting is heated as described above is preferred to be less than or equal to 300° C. or less than equal to the boiling point of the organic solvent and more preferably less than or equal to 200° C. If the heating temperature exceeds 300° C., the efficiency of removing the organic solvent improves but there are cases where decomposition or quality change of the organic solvent or the polymer electrolyte membrane occurs or where the configuration of the polymer electrolyte membrane obtained becomes poor (the quality level decreases). Furthermore, the lower limit of the heating temperature is preferred to be 50° C. If the heating temperature is less than 50° C., it becomes difficult in some cases to sufficiently remove the organic solvent. As for the heating method, an arbitrary known method such as hot air, infrared radiation, or microwaves, can be performed. Furthermore, heating may be performed in an atmosphere of an inert gas such as nitrogen.

After the membrane obtained by flow casting is heated to evaporate the organic solvent, it is preferable that the organic solvent in the polymer electrolyte membrane be extracted by using a poor solvent for the membrane which intimately mixes with the organic solvent. If such extraction is not performed, it is likely that the amount of the organic solvent remaining in the polymer electrolyte membrane is excessively large and therefore there occurs a decline in characteristics of the membrane such as decline in ionic conductivity or increase of the swelling of the membrane.

As for the poor solvent, it suffices that an appropriate one according to the precursor membrane or the kind of the solvent used in the step of flow casting is used. For example, water, alcohol, ketone, ether, low-molecular hydrocarbon, halogen-containing solvents or the like can be cited. When the solvent used in the step of flow casting intimately mixes with water, it is preferable to use water as the poor solvent.

The method of extracting the organic solvent in the polymer electrolyte membrane with a poor solvent is not particularly limited. However, it is preferable to perform the extraction so that the poor solvent has uniform contact with the polymer electrolyte membrane. For example, a method in which the polymer electrolyte membrane is immersed in the poor solvent and a method in which the poor solvent is applied or sprayed to the polymer electrolyte membrane can be cited. These methods may be performed twice or more or may also be performed in combination.

As for the polymer electrolyte membrane, it is also preferable to further contain at least one species of transition metal selected from Ce, Mn, Ti, Zr, V, Cr, Mo, W, Co, Rh, Ir, Ni, Pd, Pt, Ag, Au, and Ru. As for these transition metals, one or more species selected from the set consisting of the transition metals, the ions of the transition metals, the salts containing the transition metal ions, the complexes containing the transition metal ions, and the oxides of the transition metals can be used.

In particular, because of high functionality as a radical scavenging agent and a peroxide decomposing agent, it is preferable to use Ce, Mn, V, W, Co, Rh, Ir, Ni, Pd, Pt, Ag, Au, or Ru, more preferably Ce, Mn, Co, Rh, Ir, Ni, Pd, Pt, Au, or Ru, even more preferably Ce, Mn, Co, Rh, Ni, Pd, Pt, or Ru, and most preferably Ce, Mn, Co, Rh, Pd, Pt, or Ru.

When the polymer electrolyte membrane contains a transition metal, the content rate of the transition metal in the polymer electrolyte membrane can be selected as appropriate taking into consideration the balance between the electricity generation characteristic and the durability and is not limited. However, the content rate thereof is preferred to be greater than or equal to 0.002 wt % and less than or equal to 15 wt % of the entire polymer electrolyte composition. The content rate thereof is more preferably greater than or equal to 0.01 wt % and less than or equal to 5 wt % and most preferably greater than or equal to 0.02 wt % and less than or equal to 3 wt %. If it is greater than or equal to 0.002 wt %, the durability further improves. If it is less than or equal to 15 wt %, the proton conductivity further improves.

Furthermore, when the polymer electrolyte membrane contains a transition metal, the content ratio between the polyazole and the transition metal in the polymer electrolyte membrane can also be selected as appropriate by taking into consideration the balance between the electricity generation characteristic and the durability and is not limited; however, the molar ratio of nitrogen/transition metal is preferred to be greater than or equal to 0.1 and less than or equal to 100. The molar ratio thereof is more preferably greater than or equal to 1 and less than or equal to 20 and most preferably greater than or equal to 5 and less than or equal to 10. If it is greater than or equal to 0.1, the proton conductivity and the hot water resistance further improve. If it is less than or equal to 100, the durability further improves.

With regard to the mode of the transition metal ion, there is no particular limitation. However, as concrete examples, chloride ions, bromide ions, iodide ions, nitrate salts, sulfate salts, sulfonate salts, carbonate salts, phosphate salts, phosphonate salts, acetate salts, oxalate salts, acetyl acetonato complexes and the like can be cited. In particular, because of being highly effective in restraining the oxidation degradation, nitrate salts, sulfate salts, sulfonate salts, carbonate salts, phosphate salts, phosphonate salts, and acetate salts are preferable and because of being inexpensive and being easy to add to the electrolyte composition, nitrate salts, phosphate salts, and acetate salts are more preferable.

The transition metal ion may be present alone or may also be present as a complex coordinated with an organic compound, a polymer and the like. In particular, the transition metal ion being in a complex with a phosphine compound or the like is preferable from the viewpoint of being able to restrain the elution of an additive during use and, in the case where a polydentate phosphine compound is used, is preferable because of making a polymer electrolyte membrane that is particularly excellent in hot water resistance.

Furthermore, when an oxide of a transition metal is used, cerium oxide, manganese oxide, cobalt oxide, nickel oxide, chromic oxide, iridium oxide, and lead oxide can be cited as preferable examples. In particular, because of high effectiveness in restraining oxidation degradation, it is preferable to use cerium oxide or manganese oxide.

As for the polymer electrolyte membrane, it is also preferable to further contain a sulfur-containing additive. In particular, sulfides are preferable from the viewpoint of electricity generation performance, aromatic polysulfide is more preferable from the viewpoint of heat resistance and chemical stability, and polyparaphenylene sulfide is particularly preferable from the viewpoint of production cost.

Other than the methods described above as methods for causing polyazole to be contained in the ionic group-containing polymer electrolyte membrane, for example, a method in which the polymer electrolyte membrane is brought into contact with a liquid in which polyazole has been dissolved can be adopted. As methods of causing the contact, immersion, bar coating, spraying coating, a slit die, knife coating, an air knife, brushing, gravure coating, screen printing, ink jet printing, doctor blade over roll (a method in which an additive solution or dispersion liquid is applied to a polymer electrolyte composition forming and then passed through a space between a knife and a supporting roll to remove surplus liquid) or the like can be cited but these are not restrictive.

The membrane thickness of the polymer electrolyte membrane is preferred to be 1 to 2000 μm. The membrane thickness is preferred to be thicker than 1 μm to attain the mechanical strength and the physical durability of the membrane that withstand practical use and is preferred to be thinner than 2000 μm for reduction in membrane resistance, that is, improvement in electricity generation performance. An even more preferable range of the membrane thickness is 3 to 50 μm and a particularly preferable range is 10 to 30 μm. The membrane thickness can be controlled by the concentration of the electrolyte composition solution for use in the solution membrane formation described above or the thickness of application onto the substrate.

In the polymer electrolyte membrane, besides the foregoing main composition, additives that are used in ordinary macromolecular compounds such as a crystallization nucleating agent, a plasticizing agent, a stabilizing agent, an antioxidant, or a mold release agent, can be further added within a range that does not contradict our purposes.

The polymer electrolyte membrane may be caused to contain various polymers, elastomers, fillers, fine particles, various additives and the like within ranges that do not have adverse effect on the foregoing characteristics, for the purpose of improving the mechanical strength, the thermal stability, the workability and the like. Furthermore, the polymer electrolyte membrane may be reinforced with a finely porous membrane, a non-woven fabric, a mesh and the like.

A catalyst coated membrane obtained by layering an electrode catalyst layer on the polymer electrolyte membrane through application or transfer of the electrode catalyst layer can also be preferably used.

Membrane Electrode Assembly

When the above-described polymer electrolyte membrane is to be used in a fuel cell, a membrane electrode assembly in which the polymer electrolyte membrane and electrodes are joined is manufactured. At this time, there is no particular restriction regarding the joining method for the polymer electrolyte membrane and the electrodes (membrane electrode assembly), and it is possible to apply a known method (e.g., the chemical plating method described in Electrochemistry, 1985, 53, p. 261, the hot-press joining method for a gas diffusion electrode described in Erekutorokemikaru Saiensu Ando Tekunorojii (Electrochemical Science and Technology), 1988, 135, 9, p. 2209, compiled by Denkikagaku Kyoukai (J. Electrochem. Soc.) and the like).

When heated pressing is to be performed for consolidation, it suffices that the temperature and the pressure are selected as appropriate depending on the thickness of the electrolyte membrane, the moisture percentage, the catalyst layer, or the electrode base material. Furthermore, the conjugation by press is also possible even in a state in which the electrolyte membrane is dry or a state in which it has absorbed water. As concrete press methods, there can be cited roll press with the pressure and the clearance prescribed, flat press with the pressure prescribed and the like. It is preferable to perform the method at 0° C. to 250° C. from the viewpoint of industrial productivity, restraint of the thermal decomposition of a macromolecular material that has an ionic group and the like. Pressurization is preferred to be as weak as possible from the viewpoint of protection of the electrodes and the electrolyte membrane. In a flat press, a pressure of 10 MPa or less is preferable. Superposing electrodes and an electrolyte membrane on each other to make a fuel cell without carrying out the conjugation by the heated pressing step is also one of preferable choices from the viewpoint of preventing short-circuits of the anode and cathode electrodes. If this method is applied and the electricity generation is repeatedly performed as a fuel cell, there is a tendency that the degradation of the electrolyte membrane whose cause is speculated as being a short-circuited site is restrained. Thus, the durability as a fuel cell is good.

The usage of the polymer electrolyte fuel cells that use the polymer electrolyte membrane is not particularly limited. However, a power supply source for a mobile unit is a preferable use. Particularly, the polymer electrolyte fuel cells can be preferably used as alternatives to the conventional primary batteries or secondary batteries or hybrid electricity sources combined with these batteries such as electric power supply sources for portable appliances, including cellular phones, personal computers, PDAs, televisions, radios, music players, game machines, headsets, DVD players or the like, various robots of a human type or an animal type for industrial purposes and the like, home electric appliances, including cordless vacuum cleaners and the like, toys, moving units, including wheeled vehicles such as electric cycles, autobicycles, motor vehicles, buses, and trucks, ships and boats, railroads and the like, stationary type electricity generators and the like.

EXAMPLES

Hereinafter, our membranes, assemblies and fuel cells will be described in more detail with reference to examples.

However, this disclosure is not limited to these. Incidentally, measurement conditions for various physical properties are as follows. As for the number n of measurements, measurement without any particular mention thereof was carried out with n=1.

(1) Ion Exchange Capacity (IEC)

Measurement was performed by a neutralization titration method by the following procedure. Measurement was performed three times and an average value thereof was taken.
- (i) After a membrane surface of an electrolyte membrane having been subjected to proton substitution and having been washed thoroughly with pure water was wiped to remove moisture, vacuum drying was performed at 100° C. for 12 hours or more and then the dry weight thereof was found.
- (ii) 50 mL of a 5 wt % sodium sulfate aqueous solution was added to the electrolyte, and the mixture was left standing still for 12 hours followed by performing ion exchange. (iii) The produced sulfuric acid was titrated by using a 0.01 mol/L sodium hydroxide aqueous solution. As an indicator reagent, 0.1 w/v % of a commercially sold phenolphthalein solution for titration was added. The point at which a light reddish purple developed was determined as the end point.
- (iv) The ion exchange capacity was found by the following formula.

Ion exchange capacity (meq/g)=[concentration of sodium hydroxide aqueous solution (mmol/ml)× titrated amount (ml)]/dry weight of sample (g)

(2) Proton Conductivity ($H^+$ Conductivity)

Membrane-shaped samples, after being immersed in pure water of 25° C. for 24 hours, were held for 30 minutes at each step in a constant-temperature constant-humidity tank at 80° C. and a relative humidity of 25 to 95% and subjected to measurement of proton conductivity by a constant-potential alternating-current impedance method.

As the measurement apparatus, an electrochemical measurement system made by Solartron (Solartron 1287 Electrochemical Interface and Solartron 1255B Frequency Response Analyzer) was used to perform the constant-potential impedance measurement by a two-terminal method, whereby the proton conductivity was found. The alternating-current amplitude was 50 mV. As for the samples, membranes of 10 mm in width and 50 mm in length were used. A measurement jig was manufactured using a phenol resin and a measurement portion was made open. As electrodes, platinum plates (100 μm in thickness, two pieces) were used. The electrodes were disposed, with the inter-electrode distance being 10 mm, on the obverse and reverse sides of each sample membrane to be parallel to each other and orthogonal to the lengthwise direction of the sample membrane.

(3) Number-Average Molecular Weight, Weight-Average Molecular Weight

The number-average molecular weights and the weight-average molecular weights of polymers were measured by GPC. Using an HLC-8022GPC made by Tosoh as an integrated type apparatus of an ultraviolet detector and a differential refractometer and using two columns of TSK gel Super HM-H made by Tosoh (6.0 mm in inside diameter and 15 cm in length) as GPC columns, measurement was performed at a temperature of 40° C. and a flow of 0.2 mL/min with a sample concentration of 0.1 wt % in an N-methyl-2-pyrrolidone solvent (an N-methyl-2-pyrrolidone solvent containing 10 mmol/L of lithium bromide). By standard polystyrene conversion, number-average molecular weights and weight-average molecular weights were determined.

(4) Membrane Thickness

Measurement was performed by using an ID-C112 type made by Mitutoyo that had been set on a granite comparator stand BSG-20 made by Mitutoyo. Measurement was carried out at five locations: a site being 1 cm from the left end of the electrolyte membrane; a central site in the electrolyte membrane; a site being 1 cm from the right end of the electrolyte membrane; an intermediate site between the site being 1 cm from the left end and the central site; and an intermediate site between the site being 1 cm from the right end and the central site. An average thereof was taken as the membrane thickness.

(5) Measurement Method of Purity

Quantitative analysis was performed by gas chromatography (GC) under the following conditions.

Column: DB-5 (made by J&W company), L=30 m, $\phi$=0.53 mm, D=1.50 μm.

Carrier: helium (linear velocity=35.0 cm/sec)

Analysis Conditions

Inj. temp.: 300° C.

Detct. temp.: 320° C.

Oven: 50° C.×1 min

Rate: 0° C./min

Final: 300° C.×15 min

SP ratio: 50:1

(6) Nuclear Magnetic Resonance Spectrum (NMR)

In the following measurement conditions, measurement of 1H-NMR was performed to perform structure checking and quantitation of the molar composition ratio between the segment (A1) containing an ionic group and the segment (A2) not containing an ionic group. The molar composition ratio was calculated from the integrated values of peaks observed at 8.2 ppm (deriving from disulfonate-4,4'-difluorobenzophenone) and 6.5 to 8.0 ppm (deriving from the entire aromatic protons except disulfonate-4,4'-difluorobenzophenone).

Apparatus: EX-270 made by JEOL Ltd.

Resonance frequency: 270 MHz (1H-NMR)

Measurement temperature: room temperature

Dissolution solvent: DMSO-d6

Internal standard substance: TMS (0 ppm)

Cumulative number: 16

(7) Observation of Phase Separation Structure by Transmission Electron Microscope (TEM)

Sample pieces were immersed in a 2 wt % lead acetate aqueous solution as a staining agent and were left standing at 25° C. for 24 hours. The samples subjected to the staining process were taken out and embedded in a visible-light curing resin and irradiation with visible light was performed for 30 seconds for fixation.

Using an ultramicrotome, thin pieces of 100 nm in thickness were cut off at room temperature. The obtained thin pieces were collected on a Cu grid and subjected to TEM observation. The observation was carried out with an acceleration voltage of 100 kV. As for image taking, the image taking was carried out so that the photographic magnification was ×8,000, ×20,000, and ×100,000. As for an appliance, TEM H7100FA (made by Hitachi, Ltd.) was used.

Furthermore, the presence or absence of an island-shaped phase separation structure deriving from the polyazole was checked by executing similar TEM observation without going through the staining step by lead acetate solution immersion.

(8) Energy Dispersion Type X-ray Analysis (EDX)

An rTEM detector (made by AMETEK) was connected to the foregoing TEM and was used. Detailed analysis contents were as shown in (a) and (b) below.

(a) Analysis of the Polyazole Concentration in the Hydrophilic Domain and the Hydrophobic Domain With respect to 50 points in each of the hydrophilic domain and the hydrophobic domain, element analysis was performed to find an inside-domain average nitrogen amount. According to the following formula, the polyazole concentration in each domain was calculated.

Polyazole concentration (wt %)=100×[inside-domain average nitrogen amount (wt %)−polymer nitrogen amount (wt %)]/[azole nitrogen amount (wt %)−polymer nitrogen amount (wt %)]

The polymer nitrogen amount and the azole nitrogen amount are the amounts of nitrogen contained by the polymer electrolyte and the polyazole, respectively.

(b) Analysis of a Phase Separation Structure having Polyazole as a Main Component at the Time of Formation of a Sea/Island Structure When the polymer electrolyte membrane formed a sea/island structure, distribution of polyazole was measured by using a method shown below.

That is, at the 50 points in the island phase in the sea/island structure, element analysis was performed to find an inside-island phase average nitrogen amount and then, similarly to the foregoing (a) clause, the content of polyazole in the island phase was found. At this time, when the polyazole content was 50% or greater, it was determined that, in the island phase, polyazole was a main component.

(9) Chemical Stability (A) Molecular Weight Retention Rate

With regard to the electrolyte membrane soluble in N-methyl pyrrolidone (NMP), the electrolyte membrane was degraded by the following method and the molecular weights thereof before and after the degradation test were compared to evaluate the chemistry stability.

A pair of 5 cm square pieces cut from a commercially sold electrode, a gas diffusion electrode for fuel batteries made by BASF "ELAT (registered trademark) LT120ENSI" 5 g/m2 Pt, was prepared. The two pieces, as a fuel electrode and an oxidation electrode, were superposed face-to-face so that the electrolyte membrane was sandwiched therebetween. Then, heated pressing was performed at 150° C. and 5 MPa for 3 minutes to obtain a membrane-electrode assembly for evaluation.

This membrane-electrode assembly was set in a JARI standard cell "Ex-1" (electrode area of 25 cm2) made by EIWA Corporation. While the temperature was kept at 80° C., air (174 mL/min, back pressure of 0.05 MPaG) and hydrogen (70 mL/min, back pressure of 0.1 MPaG) in a low-humidified state were introduced into the cell. Then, an accelerated degradation test in an open circuit was performed. After the fuel cell was operated for 200 hours in this condition, the membrane-electrode assembly was taken out, put into an ethanol/water mixture solution and subjected to a further treatment of ultrasonification, whereby the catalyst layer was removed. Then, the molecular weight of the remaining polymer electrolyte membrane was measured and was evaluated as a molecular weight retention rate.

(B) Open-Circuit Retention Time

With regard to the electrolyte membrane absolutely insoluble in NMP, the electrolyte membrane was degraded by the following method and the retention times for open-circuit voltage were compared to evaluate the chemistry stability.

By substantially the same method as described above, a membrane-electrode assembly was manufactured and set in a cell provided for evaluation. Subsequently, in substantially the same condition as described above, an accelerated degradation test in an open circuit was performed. The time taken before the open-circuit voltage decreased to 0.7 V or lower was evaluated as an open-circuit retention time.

(C) Voltage Retention Rate

Even though the open-circuit retention time evaluation of (B) mentioned above was performed, 0.7 V or greater was able to be maintained for 5000 hours or more, the evaluation was discontinued and an early-period voltage and the voltage after 5000 hours were compared to determine a voltage retention rate, whereby the chemical durability was evaluated.

(10) Swelling Rate

Measurement was performed on the basis of the sizes of membrane-shaped samples by using the following technique.

(i) Samples were cut out into about 5 cm by 5 cm and the size of each side thereof was measured. At this time, an arbitrary side is defined as being in an x-direction and a side perpendicular to the x-direction is defined as being in a y-direction.

(ii) Samples were immersed in pure water of 80° C. for 2 hours to absorb water.

(iii) The samples were taken out of the water and the lengths of the two sizes defined as being in the x-direction and the y-direction in (i) were measured.

(iv) The amount of swelling in each direction was calculated on the basis of the following formula.

Swelling rate (%)=[{post-water immersion length (cm)−pre-water immersion length (cm)}/pre-water immersion length (cm)]×100

(11) Dynamic Light Scattering (DLS)

Polyazole was dissolved in N-methyl-2-pyrrolidone to achieve a concentration of 0.5 wt %. This solution was subjected to measurement of an arithmetic average particle diameter at 25° C. by using a dynamic light scattering type particle diameter distribution measurement apparatus LB-500 made by HORIBA, Ltd.

Synthesis Example 1

Synthesis of 2,2-bis(4-hydroxy phenyl)-1,3-dioxolane (K-DHBP) Represented by General Formula (G1)

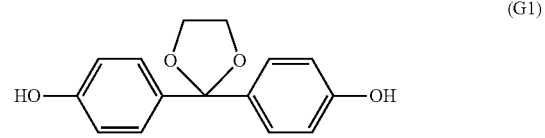

(G1)

49.5 g of 4,4'-dihydroxy benzophenone, 134 g of ethylene glycol, 96.9 g of trimethyl orthoformate, and 0.50 g of p-toluenesulfonic acid monohydrate were loaded and dissolved in a 500 mL flask equipped with a stirrer, a thermometer, and a distillation pipe. After that, the temperature was kept at 78 to 82° C. and stirring was performed for 2 hours. Furthermore, the internal temperature was gradually increased to 120° C. and the heating was carried out until the distillation of methyl formate, methanol, and trimethyl orthoformate completely stopped. After this reaction liquid was cooled to room temperature, the reaction liquid was diluted with ethyl acetate. Then, an organic layer was washed with 100 mL of a 5 wt % potassium carbonate aqueous solution. After liquid separation, an organic solvent was distilled out. 80 mL of dichloromethane was added to the residual so that crystal was caused to precipitate out. This was filtered and dried to obtain 52.0 g of 2,2-bis(4-hydroxy phenyl)-1,3-dioxolane. This crystal was subjected to GC analysis and 99.9 wt % of 2,2-bis(4-hydroxy phenyl)-1,3-dioxolane and 0.1 wt % of 4,4'-dihydroxy benzophenone were found.

Synthesis Example 2

Synthesis of disodium 3,3'-disulfonate-4,4'-difluorobenzophenone Represented by General Formula (G2)

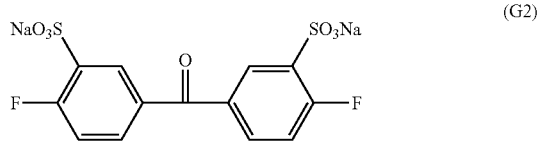

109.1 g of 4,4'-difluorobenzophenone (Aldrich, reagent) was reacted at 100° C. for 10 hours in 150 mL of fuming sulfuric acid (50 wt % SO$_3$) (Wako Pure Chemical, reagent). After that, the liquid was put little by little into a large amount of water and neutralized with NaOH, and then 200 g of table salt was added to precipitate a synthesized product. The obtained precipitate was filtered out and re-crystallized from ethanol aqueous solution to obtain disodium 3,3'-disulfonate-4,4'-difluorobenzophenone indicated by the foregoing general formula (G2). The purity was 99.4 wt %. The structure was checked by 1H-NMR. As for impurities, quantitative analysis was performed by capillary electrophoresis (organic substances) and ion chromatography (inorganic substances).

Synthesis Example 3

Synthesis of an Oligomer a1' Not Containing an Ionic Group and Represented by General Formula (G3)

16.59 g (120 mmol) of potassium carbonate (Aldrich, reagent), 25.8 g (100 mmol) of K-DHBP obtained in Synthesis Example 1 mentioned above, 20.3 g (93 mmol) of 4,4'-difluoro-benzophenone (Aldrich, reagent) were put in a 1000 mL three-necked flask equipped with a stirrer, a nitrogen introduction pipe, and a Dean-Stark trap. After nitrogen substitution, dehydration was performed in 300 mL of N-methyl pyrrolidone (NMP) and 100 mL of toluene at 160° C. The temperature was then increased to remove toluene and polymerization was performed at 180° C. for 1 hour. Reprecipitation was performed with a large amount of methanol to carry out purification. Thus, an oligomer a1 (with terminal ends being hydroxyl groups) not containing an ionic group was obtained. The number-average molecular weight thereof was 10000.

1.1 g (8 mmol) of potassium carbonate (Aldrich, reagent) and 20.0 g (2 mmol) of the oligomer a1 (with terminal ends being hydroxyl groups) not containing an ionic group were put in a 500 mL three-necked flask equipped with a stirrer, a nitrogen introduction pipe, and a Dean-Stark trap. After nitrogen substitution, dehydration was performed in 100 mL of N-methyl pyrrolidone (NMP) and 30 mL of cyclohexane at 100° C. The temperature was then increased to remove cyclohexane. 4.0 g (12 mmol) of decafluorobiphenyl (Aldrich, reagent) was put in, and reaction was conducted at 105° C. for 1 hour. Reprecipitation was performed with a large amount of isopropyl alcohol to carry out purification. Thus, an oligomer a1' (with terminal ends being fluoro groups) not containing an ionic group and indicated by formula (G3) was obtained. The number-average molecular weight thereof was 12000. The number-average molecular weight of the oligomer a1' not containing an ionic group was determined as a value of 11400 obtained by subtracting the value for the linker sites (molecular weight of 630).

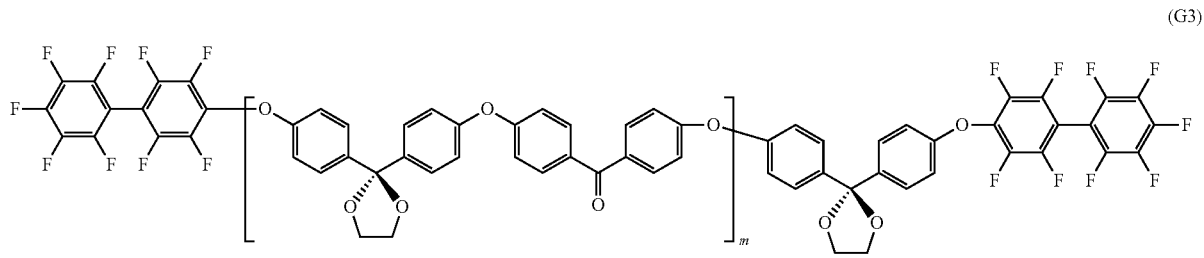

Synthesis of an Oligomer a2 Containing an Ionic Group and Represented by General Formula (G4)

27.6 g (200 mmol) of potassium carbonate (Aldrich, reagent), 12.9 g (50 mmol) of K-DHBP obtained in Synthesis Example 1 mentioned above, 9.3 g (50 mmol) of 4,4'-biphenol (Aldrich, reagent), 39.3 g (93 mmol) of disodium 3,3'-disulfonate-4,4'-difluorobenzophenone obtained in Synthesis Example 2 mentioned above, and 17.9 g (82 mmol) of 18-crown-6 (Wako Pure Chemical) were put in a 1000 mL three-necked flask equipped with a stirrer, a nitrogen introduction pipe, and a Dean-Stark trap. After nitrogen substitution, dehydration was performed in 300 mL of N-methyl pyrrolidone (NMP) and 100 mL of toluene at 170° C. The temperature was then increased to remove toluene and polymerization was performed at 180° C. for 1 hour. Reprecipitation was performed with a large amount of isopropyl alcohol to carry out purification. Thus, an oligomer a2 (with terminal ends being hydroxyl groups) containing an ionic group and indicated by formula (G4) was obtained. The number-average molecular weight thereof was 17000.

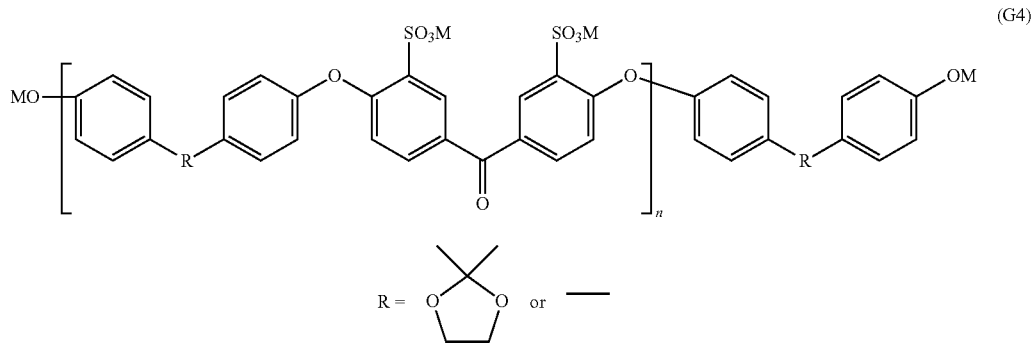

In formula (G4), M represents Na or K.

Synthesis of a Block Copolymer b1 Containing the Oligomer a2 as the Segment (A1) Containing an Ionic Group, the Oligomer a1 as the Segment (A2) not Containing an Ionic Group, and Octafluorobiphenylene as a Linker Site 0.56 g (4 mmol) of potassium carbonate (Aldrich, reagent) and 16 g (1 mmol) of the oligomer a2 (with terminal ends being hydroxyl groups) containing an ionic group were put in a 500 mL three-necked flask equipped with a stirrer, a nitrogen introduction pipe, and a Dean-Stark trap. After nitrogen substitution, dehydration was performed in 100 mL of N-methyl pyrrolidone (NMP) and 30 mL of cyclohexane at 100° C. The temperature was then increased to remove cyclohexane. 11 g (1 mmol) of the oligomer a1' (with terminal ends being fluoro groups) not containing an ionic group was put in and reaction was conducted at 105° C. for 24 hours. Reprecipitation was performed with a large amount of isopropyl alcohol to carry out purification. Thus, a block copolymer b1 was obtained. The weight-average molecular weight thereof was 370 thousand.

The block copolymer b1 contained as the segment (A1) containing an ionic group and the segment (A2) not containing an ionic group the constitutional units represented by formulae (S1) and (S2) in amounts of 50 mol % and 100 mol %, respectively.

The ion exchange capacity of a polymer electrolyte membrane formed from the block copolymer b1 itself which was determined by neutralization titration was 1.8 meq/g, the molar composition ratio (A1/A2) determined by 1H-NMR was 56 mol/44 mol=1.27, and remain of a ketal group was not observed.

Synthesis Example 4

Synthesis of a Polyether Sulfone (PES) Based Block Copolymer Precursor b2' Made Up of a Segment Represented by Formula (G6) and a Segment Represented by Formula (G7)

1.62 g of anhydrous nickel chloride and 15 mL of dimethyl sulfoxide were mixed and adjusted to 70° C. 2.15 g of 2,2'-bipyridyl was added and stirring was performed at the same temperature for 10 minutes to prepare a nickel-containing solution.

At this point, 1.23 g of zinc powder was added to a solution obtained by dissolving 1.49 g of 2,5-dichlorobenzene sulfonic acid (2,2-dimethylpropyl) and 0.50 g of SUMIKA-EXCEL PES5200P (made by Sumitomo Chemical company, Mn=40,000, Mw=94,000) indicated by formula (G5) in 5 mL of dimethyl sulfoxide, and adjustment to 70° C. was made. The foregoing nickel-containing solution was poured into this and polymerization reaction was conducted at 70° C. for 4 hours. The reaction mixture was added into 60 mL of methanol and then 60 mL of a 6 mol/L hydrochloric acid was added. The mixture was stirred for 1 hour. The precipitated-out solid was separated by filtration and dried to obtain 1.62 g of a grayish white block copolymer b2' that includes segments represented by formula (G6) and formula (G7) at a yield of 99%. The weight-average molecular weight thereof was 230 thousand.

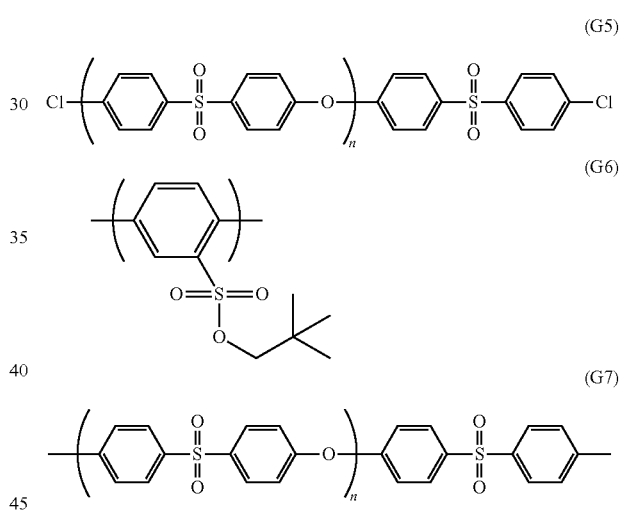

Synthesis Example 5

Synthesis of a PES Based Block Copolymer b2 Made Up of a Segment Represented by Formula (G7) and a Segment Represented by Formula (G8)

0.23 g of the block copolymer precursor b2' obtained in Synthesis Example 4 was added to a mixture solution of 0.16 g of lithium bromide monohydrate and 8 mL of N-methyl-2-pyrrolidone and was reacted at 120° C. for 24 hours. The reaction mixture was poured into 80 mL of a 6 mol/L hydrochloric acid and stirring was performed for 1 hour. The precipitated-out solid was separated by filtration. The separated solid was dried to obtain a grayish white block copolymer b2 made up of the segment indicated by formula (G7) and the segment represented by formula (G8). The weight-average molecular weight of the obtained polyarylene was 190 thousand.

The ion exchange capacity of a polymer electrolyte membrane formed from the block copolymer b2 itself which was determined by neutralization titration was 2.0 meq/g.

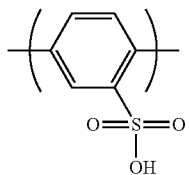

(G8)

Synthesis Example 6

Synthesis of a Hydrophobic Oligomer a3 Represented by Formula (G9)

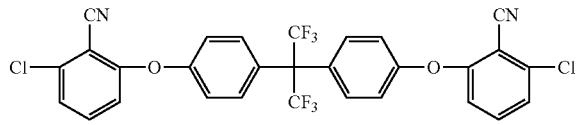

(G9)

49.4 g (0.29 mol) of 2,6-dichlorobenzonitrile, 88.4 g (0.26 mol) of 2,2-bis(4-hydroxy phenyl)-1,1,1,3,3,3-hexafluoropropane, and 47.3 g (0.34 mol) of potassium carbonate were weighed out into a three-necked flask of 1 L equipped with a stirrer, a thermometer, a cooling pipe, a Dean-Stark pipe, and a nitrogen introducing three-way cock.

After nitrogen substitution, 346 mL of sulfolane and 173 mL of toluene were added and stirring was performed. The flask was dipped in an oil bath and heating to 150° C. and reflux were performed. While the water generated by the reaction was boiled together with toluene and removed to the outside of the system via the Dean-Stark pipe, the reaction was conducted. In about three hours, generation of water became substantially unobservable. While the reaction temperature was gradually increased, most of the toluene was removed. After that, the reaction was continued at 200° C. for 3 hours. Next, 12.3 g (0.072 mol) of 2,6-dichlorobenzonitrile was added and reaction was conducted further for 5 hours.

The obtained reaction liquid, after being let to cool down, was diluted by adding 100 mL of toluene. The precipitation of by-produced inorganic compounds was removed by filtration and the filtrate was put into 2 L of methanol. A precipitated product was filtered out, collected, and dried, and then dissolved in 250 mL of tetrahydrofuran. This was reprecipitated in 2 L of methanol to obtain 107 g of an objective oligomer a3. The number-average molecular weight of the oligomer a3 was 7,600.

Synthesis Example 7

Synthesis of a Hydrophilic Monomer a4 Represented by Formula (G10)

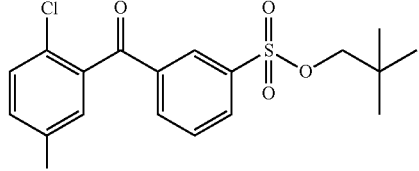

(G10)

233.0 g (2 mol) of chlorosulfonic acid was added into a three-necked flask of 3 L equipped with a stirrer and a cooling pipe. Subsequently, 100.4 g (400 mmol) of 2,5-dichlorobenzophenone was added thereto. Reaction was conducted in an oil bath of 100° C. for 8 hours. After a predetermined time, the reaction liquid was slowly poured onto 1000 g of crushed ice and extraction with ethyl acetate was performed. After an organic layer was washed with a saline solution and dried with magnesium sulfate, ethyl acetate was distilled away to obtain light-yellow crude-crystalline 3-(2,5-dichlorobenzoyl) benzene sulfonic acid chloride. The crude crystal was not purified but directly used in the next step.

38.8 g (440 mmol) of 2,2-dimethyl-1-propanol (neopentyl alcohol) was added to 300 mL of pyridine and the cooling to about 10° C. was performed. The crude crystal obtained as described above was gradually added over about 30 minutes. After the entire amount was added, stirring was performed for another 30 minutes to conduct reaction. After reaction, the reaction liquid was poured into 1000 mL of hydrochloric acid water and the precipitated-out solid was collected. The obtained solid was dissolved in ethyl acetate, washed with a sodium hydrogen carbonate aqueous solution and a saline solution, and then dried with magnesium sulfate. Subsequently, ethyl acetate was distilled away to obtain a crude crystal. This was recrystallized from methanol to obtain a white crystal of 3-(2,5-dichlorobenzoyl) benzene sulfonic acid neopentyl a4 represented by the foregoing structural formula (G10).

Synthesis Example 8

Synthesis of a Polyarylene Based Block Copolymer b3 Represented by Formula (G11)

(G11)

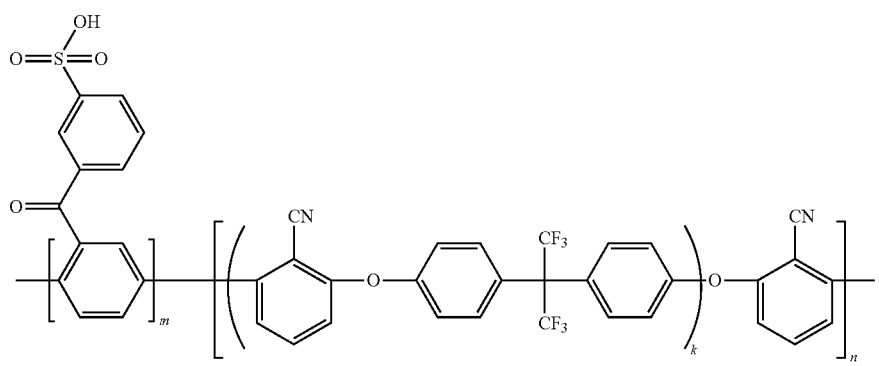

Addition of 166 mL of dried N,N-dimethylacetamide (DMAc) to a mixture of 13.4 g (1.8 mmol) of the hydrophobic oligomer (a3) synthesized in Synthesis Example 6, 37.6 g (93.7 mmol) of the 3-(2,5-dichlorobenzoyl) benzene sulfonic acid neopentyl (a4) synthesized in Synthesis Example 7, 2.62 g (4.0 mmol) of bis(triphenyl phosphine) nickel dichloride, 10.5 g (40.1 mmol) of triphenyl phosphine, 0.45 g (3.0 mmol) of sodium iodide, and 15.7 g (240.5 mmol) of zinc in a 1 L three-necked flask with a stirrer, a thermometer, and a nitrogen introduction pipe connected was performed in nitrogen.

The reaction system, while being stirred, was heated (heated finally to 82° C.) to conduct reaction for 3 hours. At an intermediate time in the reaction, a viscosity rise in the system was observed. The polymerization reaction solution was diluted with 175 mL of DMAc. After being stirred for 30 minutes, the reaction solution was filtered with celite used as a filter aid agent. In a 1 L three-necked flask with a stirrer attached, 24.4 g (281 mmol) of lithium bromide was added to the filtrate in three separate operations, with a third of the amount added at a time, at intervals of 1 hour, and reaction was conducted at 120° C. for 5 hours in a nitrogen atmosphere. After reaction, the reaction solution was cooled to room temperature and then poured into 4 L of acetone to coagulate. The coagulate was collected by filtration, dried in air, and pulverized by a mixer, and then was washed with 1500 mL of 1 N sulfuric acid while stirring was being performed. After filtration, the product was washed with ion exchange water until the pH of the wash became 5 or greater. Then, the product was dried at 80° C. overnight to obtain 38.0 g of an objective block copolymer b3. The weight-average molecular weight of this block copolymer was 180 thousand.

The ion exchange capacity of a polymer electrolyte membrane formed from the block copolymer b3 itself which was determined by neutralization titration was 2.5 meq/g.

Synthesis Example 9

Synthesis of a Polybenzimidazole (PBI) Compound Represented by Formula (G12)

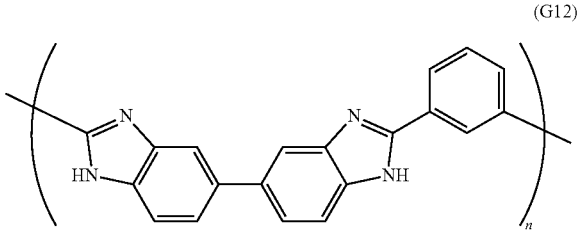

(G12)

29.7 g (93.3 mmol) of isophthalic acid diphenyl (made by Tokyo Chemical) and 5 g of polyphosphoric acid (made by Wako Pure Chemical) were put into a 250 mL two-necked flask equipped with a nitrogen introduction pipe. After nitrogen substitution, the temperature was raised to 150° C. so that melting and mixing occurred. After the cooling to room temperature was performed, 20.0 g (93.3 mmol)) of 3,3'-diamino benzidine (made by Aldrich) was added and the temperature was raised to 150° C. again. After isophthalic acid diphenyl melted, the temperature was raised to 200° C. over 5 hours. After 1 hour elapsed following attainment of 200° C., pressure reduction was performed for 30 minutes to remove phenol. After that, reaction was conducted at 200° C. for 8 hours. The obtained brown solid was purified by dissolving it in 350 g of NMP and performing filtration and reprecipitation from 3 L of a 2 wt % baking soda aqueous solution so that 25.9 g (yield of 90%) of a PBI compound indicated by the formula (G12) was obtained.

Example 1

Manufacture of Soluble (PBI) by Spray Drying 5 g of the PBI synthesized in Synthesis Example 9 and 95 g of dimethylacetamide were put into an autoclave, which was then tightly closed and whose temperature was raised to 250° C. and maintained for 24 hours. The autoclave was naturally cooled. Thus, a DMAc solution having a PBI concentration of 5 wt % was manufactured.

100 g of this PBI solution was sprayed by using a spray dryer for an organic solvent (ADL311S-A made by Yamato Scientific Co., Ltd.) to obtain 5 g of PBI powder. The operation conditions at this time were an inlet temperature of 200° C., an outlet temperature of 50° C., a liquid sending speed of 1.0 g/min, and a spray pressure of 0.25 MPa. The PBI powder obtained by this spray drying was dissolved in NMP and then subjected to molecular weight measurement by a GPC method. The weight-average molecular weight was 210 thousand. Furthermore, the DLS of the NMP solution was measured. A particle whose particle diameter was 2 nm or larger was not seen.

Manufacture of PBI-Added Membrane 20 g of the block copolymer b1 obtained in Synthesis Example 3 was dissolved in 80 g of NMP. 200 mg of PBI solubilized by spray drying mentioned above was added to the solution. Stirring was performed at 20,000 rpm for 3 minutes by a stirrer to obtain a transparent solution having a polymer concentration of 20 wt %. After the obtained solution was subjected to pressure filtration using a glass fiber filter, the solution was applied into a membrane shape onto a glass substrate by flow-casting, dried at 100° C. for 4 hours, and then thermally treated at 150° C. in nitrogen for 10 minutes to obtain a polyketal ketone membrane (membrane thickness of 15 μm). The dissolution characteristic of the polymer was very good. After immersion in a 10 wt % sulfuric acid aqueous solution at 95° C. for 24 hours for proton substitution and deprotection reaction, thorough washing was performed by immersion in a largely excess amount of pure water for 24 hours to obtain a polymer electrolyte membrane f1.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=85:15. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Example 2

An electrolyte membrane f2 was produced substantially in the same manner as in Example 1, except that PBI was 6 g.

In the TEM observation, a phase separation structure of a co-continuous mode having a cycle length of 30 nm was able to be identified. Continuous phases were formed in both a domain containing an ionic group and a domain not containing an ionic group. Furthermore, abundance ratio of PBI calculated from the distribution of nitrogen atoms by using EDX was inside-hydrophilic domain:inside-hydrophobic domain=72:28. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Example 3

An electrolyte membrane f3 was produced in substantially the same manner as in Example 1, except that PBI was 4 mg.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=92:8. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. Separately, the ion exchange capacity, the proton conductivity, and the swelling rate were measured. Results thereof are shown in Table 1.

Example 4

Manufacture of a Phthalocyanine-Added Membrane

An electrolyte membrane f4 was produced in substantially the same manner as in Example 1, except that phthalocyanine (made by Wako Pure Chemical Industries company) was used instead of PBI.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=77:23. An island-shaped phase separation structure deriving from phthalocyanine (phase separation being 2 nm or larger and having phthalocyanine as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Example 5

Manufacture of a PBI and Nitric Acid Cerium (III)-Added Membrane 0.716 g of nitric acid cerium (III) (made by Aldrich company) was dissolved in pure water to make 30 L, whereby a 55 µmol/L nitric acid cerium (III) solution was prepared. 20 g of the polymer electrolyte membrane f1 produced in Example 1 was immersed in this solution for 72 hours. By ion exchange with sulfonic acid groups, the membrane was caused to take up cerium ions so that a polymer electrolyte membrane f5 was obtained.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=80:20. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Example 6

Manufacture of a PBI and Platinum Fine Particle-Added Membrane

An electrolyte membrane f6 was produced in substantially the same manner as in Example 1, except that 200 mg of a platinum fine particle (made by STREM) was used in addition to 200 mg of PBI.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=84:16. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Example 7

Manufacture of a PBI and Acetic Acid Palladium (II)-Added Membrane

An electrolyte membrane f7 was produced in substantially same manner as in Example 1, except that 200 mg of acetic acid palladium (II) (made by Wako Pure Chemical Industries company) was used in addition to 200 mg of PBI.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=83:17. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Example 8

Manufacture of a PBI and Polyphenylene Sulfide (PPS)-Added Membrane

An electrolyte membrane f8 was produced in substantially the same manner as in Example 1, except that 200 mg of PPS (made by Aldrich company, with a 375° C.-melt viscosity of 275 poise) was used in addition to 200 mg of PBI.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=84:16. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Example 9

Manufacture of a PBI, acetic acid palladium (II), and PPS-added membrane

An electrolyte membrane f9 was produced in substantially the same manner as in Example 1, except that nitric acid palladium (II) (made by Wako Pure Chemical Industries company) and PPS (made by Aldrich company, with a 375° C.-melt viscosity of 275 poise) were used in addition to 200 mg of PBI.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=83:17. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Example 10

Manufacture of a PBI Alkali Salt-Added Membrane 5 g of the PBI synthesized in Synthesis Example 9, 1.5 g of sodium hydroxide, 1 g of water, and 2 g of ethanol were mixed and stirred at 80° C. for 12 hours to obtain a reddish brown solution of PBI. After the organic solvent was distilled away, washing with a large amount of pure water was performed to remove an excess amount of sodium hydroxide, whereby 5.2 g of PBI alkali salt was obtained. The DLS of this alkali salt was measured and a particle having a particle diameter of 2 nm or larger was not seen.

An electrolyte membrane f10 was produced in substantially the same manner as in Example 1, except that 214 mg of PBI alkali salt was used instead of 200 mg of the PBI solubilized by spray drying.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=88:12. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Example 11

Synthesis of a Low-Molecular Weight PBI

A low-molecular weight PBI was synthesized in substantially the same manner as in Synthesis Example 9, except that the loading amount of isophthalic acid diphenyl was changed to 28.0 g. The weight-average molecular weight was 5000. Furthermore, the DLS was measured and a particle having a particle diameter of 2 nm or larger was not seen. Manufacture of a low-molecular weight PBI-added membrane An electrolyte membrane f11 was produced in substantially the same manner as in Example 1, except that 200 mg of a low-molecular weight PBI was used instead of 200 mg of the PBI solubilized by spray drying.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=89:11. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Example 12

Manufacture of an NRE211CS and Spray Drying-Solubilized PBI-Mixed Membrane

An electrolyte membrane f12 was produced in substantially the same manner as in Example 1, except that NRE211CS (Nafion) was used instead of the block copolymer b1.

In the TEM observation, no phase separation structures of any kind could be identified (a phase separation being 2 nm or larger and having PBI as a main component was not seen, either).

Because the obtained membrane was insoluble in NMP and the molecular weight retention rate thereof was not capable of being measured, an open-circuit retention time was measured as a durability test. Separately, the ion exchange capacity, the proton conductivity, and the swelling rate were measured. Results thereof are shown in Table 1.

Example 13

Manufacture of a PES Based Block Copolymer and Spray Drying-Solubilized PBI-Mixed Membrane An electrolyte membrane f13 was produced in substantially the same manner as in Example 1, except that the PES based block copolymer b2 obtained in Synthesis Example 5 was used instead of the block copolymer b1.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=84:16. An island-shaped phase separation structure deriving from PBI (a phase separation being 2 nm or larger and having PBI as a main component) was not seen.

The obtained membrane was soluble in NMP. Therefore, as a durability test, the molecular weight retention rate was measured. Separately, the ion exchange capacity, the proton conductivity, and the swelling rate were measured. Results thereof are shown in Table 1.

Example 14

Manufacture of a Polyarylene Based Block Copolymer and Spray Drying-Solubilized PBI-Mixed Membrane An electrolyte membrane f14 was produced in substantially the same manner as in Example 1, except that the polyarylene based block copolymer b3 obtained in Synthesis Example 8 was used instead of the block copolymer b1.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=86:14. An island-shaped phase separation structure deriving from PBI (a phase separation being 2 nm or larger and having PBI as a main component) was not seen.

The obtained membrane was soluble in NMP. Therefore, as a durability test, the molecular weight retention rate was measured. Separately, the ion exchange capacity, the proton conductivity, and the swelling rate were measured. Results thereof are shown in Table 1.

Example 15

Manufacture of a Polymer Electrolyte Solution and a Polymer Electrolyte Membrane by Mixing a Block Copolymer Solution and a Spray Drying-Solubilized PBI Solution Mixing Manufacture of a PBI-Added Membrane After 20 g of the block copolymer b1 and 79.2 g of NMP were mixed, stirring was performed at 20,000 rpm for 3 minutes by a stirrer, whereby a block copolymer solution s1 was manufactured. Separately, after 200 mg of the PBI solubilized by spray drying mentioned above and 800 mg of NMP were mixed, stirring was performed at 20,000 rpm for 3 minutes by a stirrer to achieve dissolution, whereby a spray drying-solubilized PBI solution s2 was manufactured. The entire amounts of the obtained solutions s1 and s2 were mixed to obtain a transparent polymer electrolyte solution having a polymer concentration of 20 wt %. After the obtained polymer electrolyte solution was subjected to pressure filtration using a glass fiber filter, the solution was applied into a membrane shape onto a glass substrate by flow-casing, dried at 100° C. for 4 hours, and then thermally treated at 150° C. for 10 minutes in nitrogen to obtain a polyketal ketone membrane (membrane thickness of 15 μm). After immersion in a 10 wt % sulfuric acid aqueous solution at 95° C. for 24 hours for proton substitution and deprotection reaction, thorough washing was performed by immersion in a largely excess amount of pure water for 24 hours to obtain a polymer electrolyte membrane f15.

In the TEM observation, a phase separation structure of a co-continuous mode having a cycle length of 30 nm was able to be identified. Continuous phases were formed in both a domain containing an ionic group and a domain not containing an ionic group. Furthermore, the abundance ratio of PBI calculated from the distribution of nitrogen atoms by using EDX was inside-hydrophilic domain:inside-hydrophobic domain=88:12. An island-shaped phase separation structure deriving from PBI (a phase separation being 2 nm or larger and having PBI as a main component) was not seen.

Because the obtained membrane was insoluble in NMP and the molecular weight retention rate thereof was not capable of being measured, an open-circuit retention time was measured as a durability test. However, because the evaluation did not end within 5000 hours, the chemical durability of the electrolyte membrane was evaluated as a voltage retention rate. Separately, the ion exchange capacity, the proton conductivity, and the swelling rate were measured. Results thereof are shown in Table 1.

Comparative Example 1

An electrolyte membrane f1' was produced in substantially the same manner as in Example 1, except that PBI was not used.

In the TEM observation, a phase separation structure of a co-continuous mode having a cycle length of 30 nm was able to be identified. Continuous phases were formed in both a domain containing an ionic group and a domain not containing an ionic group.

Because the obtained membrane was insoluble in NMP and the molecular weight retention rate thereof was not capable of being measured, an open-circuit retention time was measured as a durability test. Separately, the ion exchange capacity, the proton conductivity, and the swelling rate were measured. Results thereof are shown in Table 1.

Comparative Example 2

0.716 g of nitric acid cerium (III) (made by Aldrich company) was dissolved in pure water so as to make 30 L, whereby a 55 μmol/L nitric acid cerium (III) solution was prepared. The electrolyte membrane f1' produced in Comparative example 1 was immersed in this solution for 72 hours to cause the membrane to take up $Ce^{3+}$ so that a polymer electrolyte membrane f2' was obtained.

In the TEM observation, a phase separation structure of a co-continuous mode having a cycle length of 30 nm was able to be identified. Continuous phases were formed in both a domain containing an ionic group and a domain not containing an ionic group.

Because the obtained membrane was insoluble in NMP and the molecular weight retention rate thereof was not capable of being measured, an open-circuit retention time was measured as a durability test. Separately, the ion exchange capacity, the proton conductivity, and the swelling rate were measured. Results thereof are shown in Table 1.

Comparative Example 3

An electrolyte membrane f3' was produced in substantially the same manner as in Comparative example 1, except that NRE211CS (Nafion) was used instead of the block copolymer b1.

Because the obtained membrane was insoluble in NMP and the molecular weight retention rate thereof was not capable of being measured, an open-circuit retention time was measured as a durability test. Separately, the ion exchange capacity, the proton conductivity, and the swelling rate were measured. Results thereof are shown in Table 1.

Comparative Example 4

An electrolyte membrane f4' was produced in substantially the same manner as in Comparative example 1, except that the block copolymer b2 was used instead of the block copolymer b1.

The obtained membrane was soluble in NMP. Therefore, as a durability test, molecular weight retention rate was measured. Separately, the ion exchange capacity, the proton conductivity, and the swelling rate were measured. Results thereof are shown in Table 1.

Comparative Example 5

An electrolyte membrane f5' was produced in substantially the same manner as in Comparative example 1, except that the block copolymer b3 was used instead of the block copolymer b1.

The obtained membrane was soluble in NMP. Therefore, as a durability test, molecular weight retention rate was measured. Separately, the ion exchange capacity, the proton conductivity, and the swelling rate were measured. Results thereof are shown in Table 1.

Comparative Example 6

An electrolyte membrane f6' was produced in substantially the same manner as in Example 1, except that 200 mg of the PBI synthesized in Synthesis Example 9 was used without subjecting it to a solubilizing treatment, instead of 200 mg of the PBI solubilized by spray drying. The DLS of a dispersion liquid manufactured by stirring the untreated PBI in NMP at 20,000 rpm for 3 minutes was measured. The arithmetic average particle diameter was 20 nm.

In the TEM observation, a phase separation structure of a co-continuous mode having a cycle length of 30 nm was able to be identified. Continuous phases were formed in both a domain containing an ionic group and a domain not containing an ionic group. Furthermore, particles deriving from the PBI having arithmetic average particle diameter of 20 nm (a phase separation of 20 nm having the PBI as a main component) was observed.

Because the obtained membrane was insoluble in NMP and the molecular weight retention rate thereof was not capable of being measured, an open-circuit retention time was measured as a durability test. Separately, the ion exchange capacity, the proton conductivity, and the swelling rate were measured. Results thereof are shown in Table 1.

TABLE 1

| | Polymer electrolyte membrane | | | | | Chemical stability | | | Swelling rate | |
|---|---|---|---|---|---|---|---|---|---|---|
| | | | | | | | | | | |
| | Ionic group-containing polymer electrolyte | Polyazole | Other components | IEC (meq/g) | $H^+$ conductivity (mS/cm) | Molecular weight retention rate (%) | Open-circuit retention time (hour) | Voltage retention rate (%) | x-direction (%) | y-direction (%) |
| Example 1 | b1 | PBI | | 1.78 | 2.6 | — | 5000≤ | 89 | 16.2 | 16.1 |
| Example 2 | b1 | PBI | | 1.1 | 1.2 | — | 5000≤ | 99 | 12.5 | 12.3 |
| Example 3 | b1 | PBI | | 1.8 | 2.8 | — | 4230 | — | 17.6 | 17.7 |
| Example 4 | b1 | Phthalocyanine | | 1.77 | 2.5 | — | 5000≤ | 88 | 17.8 | 17.5 |
| Example 5 | b1 | PBI | Cerium nitrate (III) | 1.73 | 2.2 | — | 5000≤ | 91 | 15.2 | 15.1 |

TABLE 1-continued

| | Polymer electrolyte membrane | | | | | Chemical stability | | | Swelling rate | |
| --- | --- | --- | --- | --- | --- | --- | --- | --- | --- | --- |
| | Ionic group- | | | | | | Molecular | | | |
| | containing polymer electrolyte | Polyazole | Other components | IEC (meq/g) | $H^+$ conductivity (mS/cm) | weight retention rate (%) | Open-circuit retention time (hour) | Voltage retention rate (%) | x-direction (%) | y-direction (%) |
| Example 6 | b1 | PBI | Platinum | 1.78 | 2.5 | — | 5000≤ | 94 | 16 | 16.4 |
| Example 7 | b1 | PBI | Palladium acetate (II) | 1.75 | 2.4 | — | 5000≤ | 92 | 15.7 | 15.8 |
| Example 8 | b1 | PBI | PPS | 1.76 | 2.5 | — | 5000≤ | 91 | 16.3 | 16.4 |
| Example 9 | b1 | PBI | Palladium acetate (II) + PPS | 1.7 | 2.1 | — | 5000≤ | 99 | 15.4 | 15.3 |
| Example 10 | b1 | PBI alkali salt | | 1.78 | 2.6 | — | 5000≤ | 90 | 16.3 | 16.3 |
| Example 11 | b1 | Low-molecular weight PBI | | 1.79 | 2.6 | — | 5000≤ | 84 | 16.9 | 16.7 |
| Example 12 | NRE211CS | PBI | | 0.9 | 2.3 | — | 450 | — | 15.3 | 14.8 |
| Example 13 | b2 | PBI | | 1.96 | 2 | 97 | — | — | 16.3 | 16.4 |
| Example 14 | b3 | PBI | | 2.4 | 2.3 | 98 | — | — | 15.9 | 15.7 |
| Example 15 | b1 | PBI solutions mixed | | 1.77 | 2.6 | — | 5000≤ | 91 | 15.9 | 15.8 |
| Comparative Example 1 | b1 | — | | 1.81 | 2.8 | — | 1520 | — | 18.1 | 18.3 |
| Comparative Example 2 | b1 | | Cerium nitrate (III) | 1.74 | 2.3 | — | 1910 | — | 16.4 | 16.3 |
| Comparative Example 3 | NRE211CS | — | | 0.92 | 2.5 | — | 90 | — | 16.2 | 15.9 |
| Comparative Example 4 | b2 | — | | 2.01 | 2.3 | 59 | — | — | 18.3 | 18.2 |
| Comparative Example 5 | b3 | — | | 2.49 | 2.6 | 65 | — | — | 17.7 | 17.4 |
| Comparative Example 6 | b1 | PBI (unsolubilized) | | 1.78 | 2.6 | — | 4720 | — | 17.8 | 18.1 |

From Table 1, Examples 1 to 11, in which soluble polyazole was added but a phase separation between the polymer electrolyte and the polyazole was not observed, had longer open-circuit retention times than Comparative examples 1 and 2, which used the same polymers. Example 15, in which a block copolymer solution and a polyazole solution were manufactured beforehand and the solutions were mixed with each other to produce a polymer electrolyte membrane, had a more improved molecular weight retention rate than Examples 1 to 11, in which polyazole was added into a block copolymer solution. Furthermore, Comparative example 6, too, in which an insoluble polyazole particle was added, had a shorter open-circuit retention time, despite the polyazole addition increasing the open-time retention time, and a greater swelling rate than Examples 1 to 11, in which a soluble polyazole was added. Furthermore, with regard to Example 12 and Comparative example 3, Example 13 and Comparative example 4, and Example 14 and Comparative example 5, too, those in which the additive was added were superior in the swelling rate and the open-circuit retention time or the molecular weight retention rate. From the foregoing, the polyazole is capable of providing a polymer electrolyte membrane with excellent durability against hydrogen peroxide or peroxide radicals generated due to electricity generation of the fuel cell.

INDUSTRIAL APPLICABILITY

The polymer electrolyte membrane is applicable to various electrochemical apparatuses (e.g., fuel batteries, water electrolysis apparatuses, chloroalkali electrolysis apparatuses, hydrogen compression apparatuses, redox flow batteries, deoxygenating membranes and the like). Among these apparatuses, the polymer electrolyte membrane is suitable for fuel batteries and particularly suitable for fuel batteries that use hydrogen as a fuel.

The usages of the polymer electrolyte fuel cell are not particularly limited but the macromolecular fuel cell can be preferably used as alternatives to the conventional primary batteries or secondary batteries or hybrid electricity sources combined with these batteries such as electric power supply sources for portable appliances, including cellular phones, personal computers, PDAs, video cameras, digital cameras and the like, home electric appliances, including cordless vacuum cleaners and the like, toys, moving units, including wheeled vehicles such as electric cycles, autobicycles, motor vehicles, buses, and trucks, ships and boats, railroads and the like, stationary type electricity generators and the like.

The invention claimed is:

1. A polymer electrolyte membrane containing an ionic group-containing polymer electrolyte and a polyazole, which is free of phase separations of polyazole as a main component having a size of 2 nm or larger as observed by a transmission electron microscope in an arbitrarily selected 15 μm×15 μm section of the membrane.

2. The polymer electrolyte membrane according to claim 1, wherein weight-average molecular weight of the polyazole is greater than or equal to 500 and less than or equal to 300 thousand.

3. The polymer electrolyte membrane according to claim 1, wherein content of the polyazole is greater than or equal to 0.002 wt % and less than or equal to 15 wt % of an entire non-volatile component of the polymer electrolyte membrane.

4. The polymer electrolyte membrane according to claim 1, wherein the ionic group-containing polymer electrolyte is an ionic group-containing aromatic hydrocarbon based polymer.

5. The polymer electrolyte membrane according to claim 1, wherein the ionic group-containing polymer electrolyte is a block copolymer that contains one or more of each of a segment (A1) containing an ionic group and a segment (A2) not containing an ionic group.

6. The polymer electrolyte membrane according to claim 5, wherein a hydrophilic domain constituted by the segment (A1) that contains an ionic group and a hydrophobic domain constituted by the segment (A2) that does not contain an ionic group have formed a phase separation structure of a co-continuous mode or a lamella mode.

7. The polymer electrolyte membrane according to claim 6, wherein polyazole concentration in the hydrophilic domain is at least twice the polyazole concentration in the hydrophobic domain.

8. The polymer electrolyte membrane according to claim 1, wherein the ionic group-containing polymer electrolyte and the polyazole have formed an ion complex.

9. A catalyst coated membrane made by layering a catalyst layer on the polymer electrolyte membrane according to claim 1.

10. A membrane electrode assembly constituted by using the polymer electrolyte membrane according to claim 1.

11. A polymer electrolyte fuel cell constituted by using the polymer electrolyte membrane according to claim 1.

12. A method of producing a polymer electrolyte membrane according to claim 1 comprising:

manufacturing a polyazole particle by using a spray drying method;

mixing an ionic group-containing polymer electrolyte, the polyazole particle, an organic solvent capable of dissolving both the ionic group-containing polymer electrolyte and the polyazole particle and preparing a uniform electrolyte composition solution; and performing solution membrane formation of the electrolyte composition solution.

13. The method according to claim 12, wherein a polymer electrolyte solution in which the ionic group-containing polymer electrolyte is dissolved in the organic solvent and a polyazole solution in which the polyazole particle is dissolved in the organic solvent are individually prepared and a uniform electrolyte composition solution is prepared by mixing the polymer electrolyte solution and the polyazole solution.

14. The method according to claim 12, wherein the organic solvent is selected from the group consisting of N-methyl-2-pyrrolidone, dimethylacetamide, dimethylformamide, dimethyl imidazolidinone, dimethyl sulfoxide, and mixtures thereof.

* * * * *